United States Patent [19]

Ishizawa et al.

[11] Patent Number: 5,521,990
[45] Date of Patent: May 28, 1996

[54] IMAGE DATA PROCESSING USING BI-LEVEL AND MULTI-LEVEL VALUE DATA

[75] Inventors: Yasuhisa Ishizawa, Yokohama; Kenjiro Chyo, Tokyo; Hiroshi Nonoshita, Yokohama; Yasuhisa Shigehara, Tokyo; Seiji Saito, Yokosuka; Shigeki Miura, Hachioji, all of Japan

[73] Assignee: Canon Kabushiki Kaisha, Tokyo, Japan

[21] Appl. No.: 460,760

[22] Filed: Jun. 2, 1995

Related U.S. Application Data

[63] Continuation of Ser. No. 162,973, Dec. 8, 1993, abandoned, which is a continuation of Ser. No. 698,328, May 6, 1991, abandoned, which is a continuation of Ser. No. 436,932, Nov. 13, 1989, abandoned, which is a continuation of Ser. No. 90,019, Aug. 27, 1987, abandoned.

[30] Foreign Application Priority Data

| Aug. 29, 1986 | [JP] | Japan | 61-204925 |
| Aug. 29, 1986 | [JP] | Japan | 61-204930 |
| Aug. 30, 1986 | [JP] | Japan | 61-202702 |
| Aug. 30, 1986 | [JP] | Japan | 61-202703 |
| Aug. 30, 1986 | [JP] | Japan | 61-202704 |
| Aug. 30, 1986 | [JP] | Japan | 61-202705 |
| Aug. 30, 1986 | [JP] | Japan | 61-202706 |

[51] Int. Cl.[6] .................................................. G06K 9/38
[52] U.S. Cl. ........................................................ 382/270
[58] Field of Search ................................... 382/232, 276, 382/270, 298; 358/262.1, 429, 433, 455, 456, 453, 467, 457, 539, 54

[56] References Cited

U.S. PATENT DOCUMENTS

| 4,004,079 | 1/1977 | Boston | 358/256 |
| 4,194,221 | 3/1980 | Stoffel | 358/283 |
| 4,231,069 | 10/1980 | Wellendorf et al. | 358/256 |
| 4,461,027 | 7/1984 | Ikeda et al. | 382/50 |
| 4,468,706 | 8/1984 | Cahill | 358/283 |
| 4,538,182 | 8/1985 | Saito et al. | 358/80 |
| 4,602,333 | 7/1986 | Komori | 382/56 |
| 4,617,596 | 10/1986 | Yoshida et al. | 382/57 |
| 4,644,392 | 2/1987 | Yamada | 358/75 |
| 4,652,935 | 3/1987 | Endoh et al. | 382/56 |
| 4,707,745 | 11/1987 | Sakano | 358/283 |
| 4,709,274 | 11/1987 | Tanioka | 382/50 |
| 4,775,886 | 10/1988 | Hirosawa | 358/75 |
| 4,885,576 | 12/1989 | Pennebaker et al. | 382/56 |
| 4,896,208 | 1/1990 | Moriya et al. | 358/453 |
| 5,072,291 | 12/1991 | Sekizawa | 358/456 |

FOREIGN PATENT DOCUMENTS

| 29327 | 5/1981 | European Pat. Off. | H04N 1/00 |
| 122430 | 10/1984 | European Pat. Off. | G03G 15/32 |
| 158155 | 10/1985 | European Pat. Off. | H04N 1/40 |
| 2128443 | 4/1984 | United Kingdom | H04N 1/02 |
| 2160738A | 12/1985 | United Kingdom | H04N 1/387 |

*Primary Examiner*—Jose L. Couso
*Attorney, Agent, or Firm*—Fitzpatrick, Cella, Harper & Scinto

[57] ABSTRACT

Disclosed is a method of processing image data, including controlling to output multi-level value image data for reproducing a multi-level value image and bi-level value image data for reproducing a bi-level value image with respect to a predetermined area, thereby reproducing the multi-level and bi-level value images which constitute a single image. Also disclosed is an interface system including a multi-level converter for converting multi-level value image data into bi-level value image data and vice versa, a resolution converter operated in synchronism with the multi-level converter to convert the resolution of the multi-level value image data, an area data memory for storing area data corresponding to an instruction input representing a multi-level or bi-level value image area, and an output device for selecting the multi-level value image data from the resolution converter or the multi-level value image data from the multi-level converter on the basis of the area data and for outputting selected data to the image output device.

31 Claims, 18 Drawing Sheets

FIG. 7
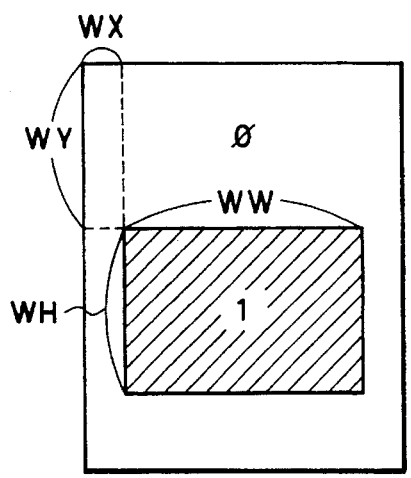
FIG. 8
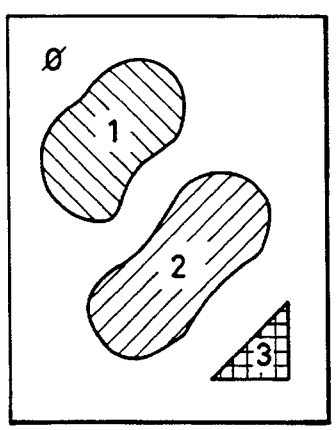
FIG. 9
| SEL SIG | LOGICAL OPERATION |
|---|---|
| 0 | AND (FOR EACH BIT) |
| 1 | OR (FOR EACH BIT) |
| 2 | MIN |
| 3 | MAX |

| BI-LEVEL DIGITAL VIDEO SIG | MULTI-LEVEL DIGITAL VIDEO SIG | SEL SIG | | | |
|---|---|---|---|---|---|
| | | 0 | 1 | 2 | 3 |
| 1 | 0 | 0 | F | 0 | F |
| 1 | F | F | F | F | F |
| 0 | 0 | 0 | 0 | 0 | 0 |
| 0 | F | 0 | F | 0 | F |
| 1 | 8 | 8 | F | 8 | F |
| 0 | 8 | 0 | 8 | 0 | 8 |

IMAGE DATA PROCESSING USING BI-LEVEL AND MULTI-LEVEL VALUE DATA

This application is a continuation of application Ser. No. 08/162,973, filed Dec. 8, 1993, which is a continuation of Ser. No. 07/698,328, filed May 6, 1991, which is a continuation of Ser. No. 07/436,932, filed Nov. 13, 1989, which is a continuation of Ser. No. 07/090,019, filed Aug. 27, 1987, all now abandoned.

BACKGROUND OF THE INVENTION

1. Field of the Invention

The present invention relates to a method and a system for processing composite image data.

2. Related Background Art

Typical conventional image data processing systems are divided between two types of systems, that is, processing systems for processing bi-level value image data such as a document, characters, and drawing data, and multi-level value image data processing systems for processing a halftone image (a multi-level value image) such as a photograph. The bi-level value image data processing system primarily aims at improvement of resolution rather than that of gradation expression, while the multi-level value image data processing system primarily aims at improvement of gradation expressions rather than that of resolutions.

When an image including characters and a photographic area is to be input to a conventional image processing system, gradation (or reproducibility of gray scale levels) of the photograph area is limited in the bi-level value image data processing system while a resolution of the character area is low in the multi-level value image data processing system.

Multi-level value image data can be expressed in a pseudo halftone mode by converting the same into bi-level value image data according to a dither method or a density pattern method. However, such a conventional technique has limitations, gradation and resolution are undesirably impaired, and a moire pattern is formed. In this manner, image degradation inevitably occurs.

Another conventional technique is also available to recognize character and halftone areas of document data and to reproduce only the halftone area in a pseudo-halftone mode. However, gradation and resolution are inevitably degraded.

SUMMARY OF THE INVENTION

It is an object of the present invention to provide a method and system capable of processing composite image data to reproduce an image of high quality, which is free from the conventional drawbacks described above.

It is another object of the present invention to provide a method and system capable of performing processing of an image including bi- and multi-level value image data to reproduce an image of high quality.

It is still another object of the present invention to provide a method and system for producing optimal image data for obtaining a high-quality reproduced image from an original image including bi-level value and halftone images.

It is still another object of the present invention to provide a method and system capable of reproducing a multi-level value image on the basis of multi-level value data and a bi-level value image on the basis of bi-level value data when an image including multi- and bi-level value images is to be output, so that a halftone image can be expressed in a sufficient gradation and characters or the like can be sharply expressed with high contrast.

It is still another object of the present invention to provide a method and system for performing high-quality editing of an image including halftone and character patterns by properly arbitrarily setting multi- and bi-level value data portions.

It is still another object of the present invention to provide a method and system for recognizing and storing areas represented by image data including bi- and multi-level value images, thereby easily reproducing a high-quality image.

It is still another object of the present invention to provide an interface system for connecting an image input/output device and a host computer and, more particularly, an interface system for interfacing image data having a high resolution with the image input/output device.

It is still another object of the present invention to provide an interface system for effectively handling bi- and multi-level value images and performing high-quality image processing.

It is still another object of the present invention to provide a method and system capable of performing high-quality image processing of bi- and multi-level value images by using a small number of image data.

The above and other objects, features, and advantages of the present invention will be apparent from the following detailed description taken in conjunction with the accompanying drawings.

BRIEF DESCRIPTION OF THE DRAWINGS

FIGS. 2-1 and 4 are plan views showing display contents;

FIGS. 2—2 and 5 are views for explaining selection signals;

FIG. 3-1 is a block diagram showing a selection control circuit;

FIG. 3-2 is a timing chart for explaining the operation of the selection control circuit shown in FIG. 3-1;

FIG. 3—3 is a view showing the structure of a memory;

FIGS. 7 and 8 are views for explaining a technique for supplying a selection signal (SEL SIG) which designates the type of logical operation;

FIG. 9 is a table showing the relationship between the selection signals and logical operations;

FIGS. 22-1 and 22-2 are flow charts for explaining an operation for printing out image data recorded in the OD 105;

DETAILED DESCRIPTION OF THE PREFERRED EMBODIMENTS

Figure 1:
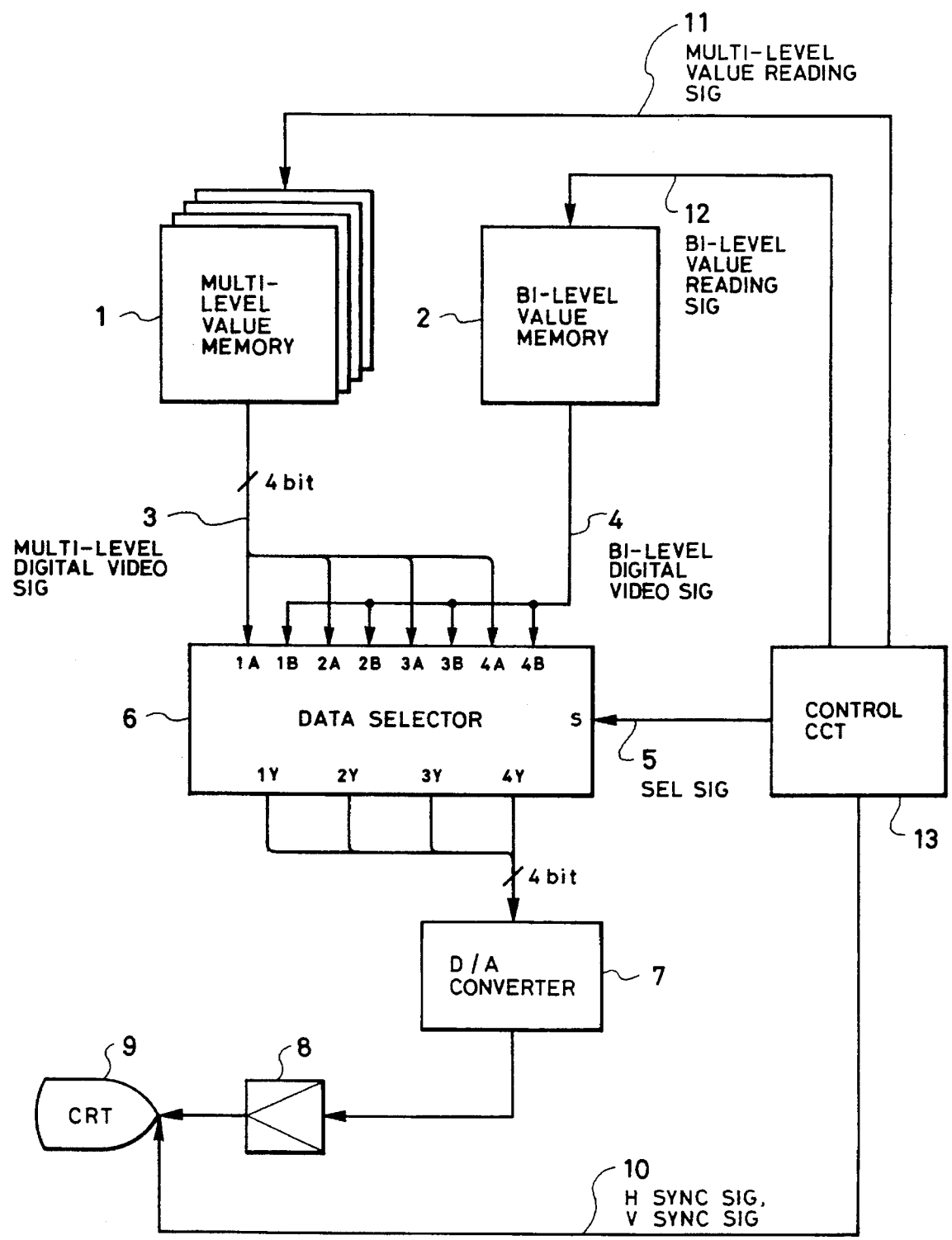
FIGS. 1 and 6 are block diagrams of data processing systems according to an embodiment of the present invention.

FIG. 1 is a CRT display system according to a first embodiment of the present invention, in which bi-level value image data such as character and graphic patterns and multi-level value image data such as photographs are simultaneously displayed, and an area of multi-level value image data can be arbitrarily designated.

A recording medium 1 stores a multi-level digital video signal (4 bits/pixel) for displaying multi-level value image data. This medium will be referred to as a multi-level value memory 1 hereinafter. A recording medium 2 stores a bi-level digital video signal (1 bit/pixel) for displaying bi-level image data. This recording medium will be referred to as a bi-level value memory 2 hereinafter. A multi-level digital video signal 3 is then read out from the multi-level value memory 1. A data selector 6 selects the multi- or bi-level digital video signal 3 or 4 in response to a selection signal 5. The signal selected by the data selector 6 is converted into an analog signal by a D/A converter 7. An amplifier 8 amplifies the analog video signal converted by the D/A converter 7 and the amplified signal is used to luminance-modulate a CRT 9. The CRT 9 is operated in response to vertical (V) and horizontal (H) sync signals 10. A multi-level value reading signal 11 instructs the reading of data from the memory 1 and also is used as an address signal for the memory. A bi-level digital video signal 4 is read out from the bi-level value memory 2. A bi-level value reading signal 12 instructs the reading of data from the memory 2 and also is used as an address signal for the memory. A control circuit 13 controls the reading/writing from and into the memories 1 and 3, and the selection of the memory 1 or 3.

Figures 1, 2:
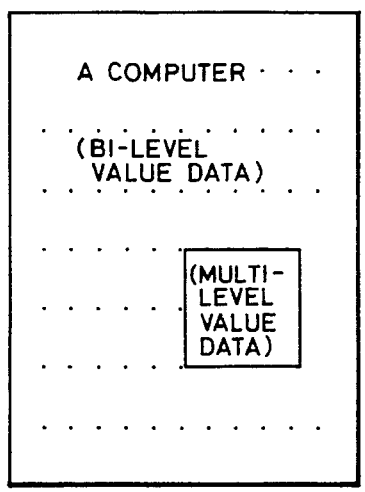
Figure 2:
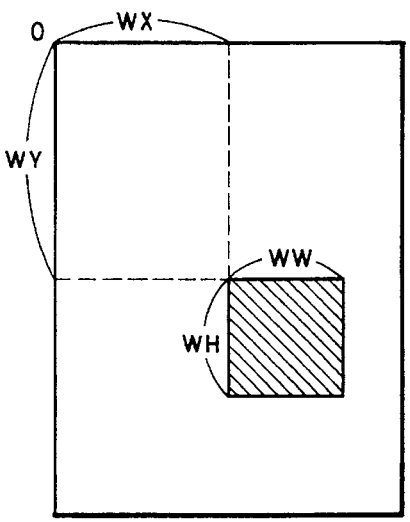

FIG. 2-1 shows a case wherein multi-level value data in a rectangular area is displayed amid bi-level value data, and FIG. 2—2 shows addressing of the rectangular area.

Figure 4:
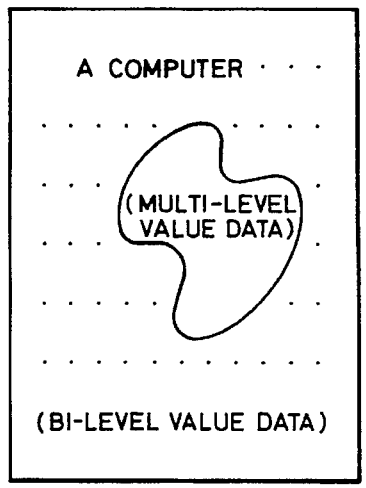
Figure 5:
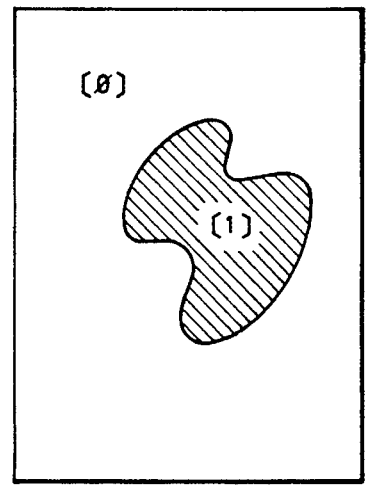

FIG. 4 shows a case wherein multi-level value data in a free (i.e., arbitrarily shaped) area is displayed amid bi-level value data, and FIG. 5 shows a memory for control of addressing of the free area.

The operation for displaying the pattern shown in FIG. 2-1 will be described. In this case, parameters WX, WY, WW, and WH shown in FIG. 2—2 are given beforehand. The multi- and bi-level value reading signals 11 and 12 are output in response to the sync signals 10, so that the multi- and bi-level value signals 3 and 4 are respectively output from the multi- and bi-level value memories 1 and 2.

The bi-level digital video signal 4 is first selected in response to the selection signal 5. When a point represented by the parameters WX and WY is obtained, the multi-level digital video signal 3 is selected correspondingly to a width represented by the parameter WW. When this operation is performed from a number of lines designated by the parameter WH, the display screen shown in FIG. 2-1 can be obtained.

Figure 3:
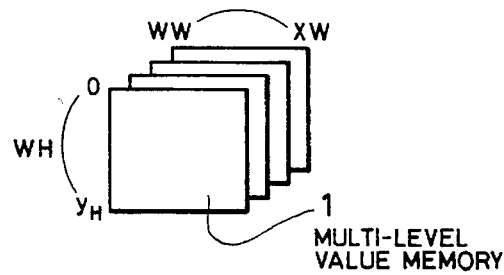
Figures 1, 3:
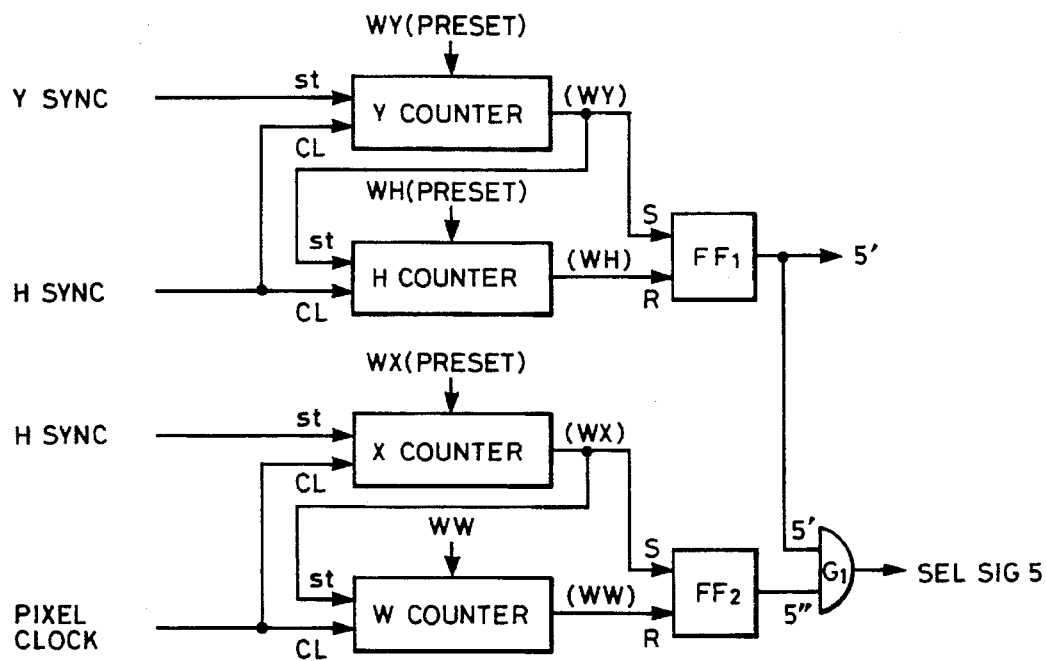
Figures 2, 3:
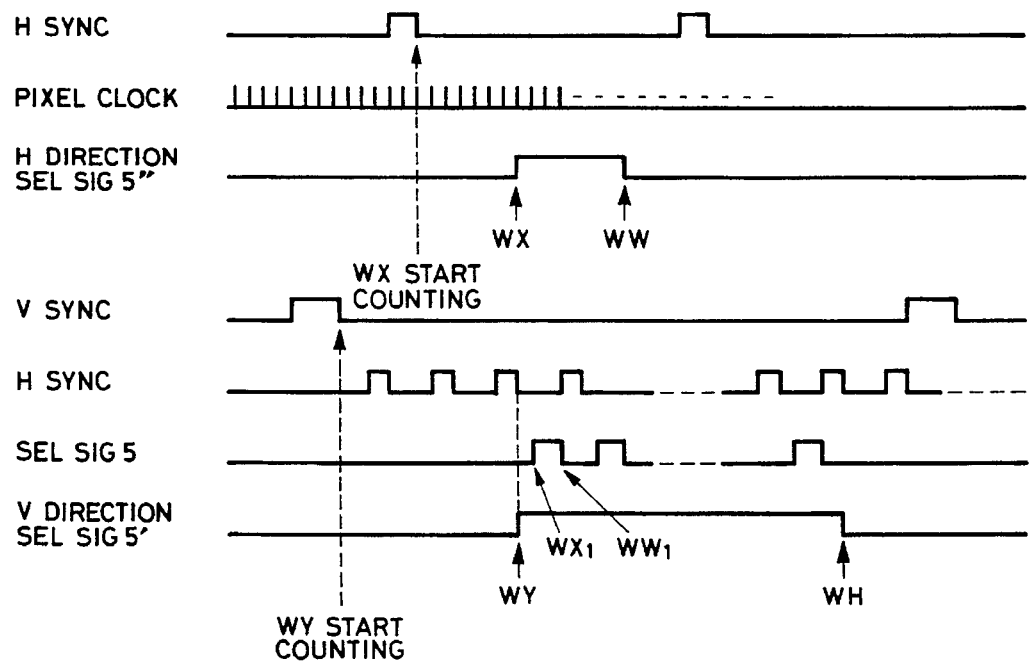

The above operation will be described in more detail to permit it to be readily understood with reference to a circuit of FIG. 3-1 and a timing chart of FIG. 3-2. Referring to FIG. 3-1, X and W counters count pixel clocks CL, i.e., dots. The X counter aims at obtaining a point represented by the parameter WX, and the W counter aims at obtaining a point represented by the parameter sum (WX+WW). The Y and H counters count pulses of the horizontal sync signals HSYNC, i.e., the lines. The Y counter aims at obtaining a point represented by the parameter WY, and the H counter aims at obtaining a point represented by the parameter sum (WY+WH). The parameters WX, WW, WY, and WH are respectively preset in the X, W, Y, and H counters. The location of the multi-level value image in the X and Y directions can be changed in accordance with values represented by the parameters WX, WW, WY, and WH. These counters and a circuit for generating the selection signal in response to the outputs from the counters are included in the control circuit 13.

Assume that data are read out from memory areas at addresses of the memories 1 and 2 which correspond to origin O, and that origin O is defined as a display start reference point and corresponds to the vertical sync signal VSYNC. The X counter starts counting pixel clocks in response to the vertical sync signal HSYNC. When the count of the X counter reaches a value of the parameter WX, a flip-flop FF2 is set. The W counter starts counting in response to the count corresponding to the value of the parameter WX. When the count of the W counter reaches a value of the parameter WW, the flip-flop FF2 is reset. As shown in FIG. 3-2, an output from the flip-flop FF2 serves as an H selection signal 5". However, a display position has not reached the point represented by the parameter WY in the vertical (V) direction, and memory read access is not yet performed.

When the Y counter starts counting in response to the vertical sync signal VSYNC and line scanning progresses to cause the count of the Y counter to correspond to a value represented by the parameter WY, flip-flop FF1 is set. At the same time, the H counter starts counting. When the count of the H counter reaches a value corresponding to the parameter WH, the flip-flop FF1 is reset. As a result, an output from the FF1 serves as a vertical (V) selection signal 5'. The H selection signal 5" serves as the selection signal 5 (i.e., an output from a gate G1) supplied to the data converter 6 while the V selection signal 5' is output. When the selection signal 5 is set at "1", the multi-value digital video signal 3 is reproduced and output in place of the bi-level digital video signal 4.

It should be noted that the multi-level value reading signal 11 may be output in response to the first transition into "1" (WX1 in FIG. 3-2) of a frame in the selection signal 5 and then read access of the multi-level value memory 1 may be initiated. In this case, a specific halftone image to be reproduced can be displayed or printed out in an arbitrary position. The control circuit 13 outputs address data for address 0 and subsequent addresses of the multi-level value memory 1 at a point (FIG. 2—2) defined by the parameters WX and WY. If the magnitudes of the parameters WW and WH correspond to the size of the multi-level value memory 1, the capacity of the memory 1 can be reduced (FIG. 3—3). It is therefore convenient to display a portrait or the like. In this case, the read line of the memory 1 is shifted by one line in the Y direction whenever the selection signal 5 is changed to "1". The halftone data represented by the multi-level value data from the memory 1 may be fitted in the area represented by the parameters WW and WH.

As shown in FIG. 5, a control memory may be arranged in which the areas represented by logic "1" and logic "0" are predetermined. The contents of the control memory are output as the selection signal 5. If the selection signal 5 is set at "0", the bi-level digital video signal 4 is selected. However, when the selection signal 5 is set at "1", the multi-level digital video signal 3 is selected, thereby obtaining the display contents of FIG. 4. The control memory will be described as an image area memory later.

Figure 6:
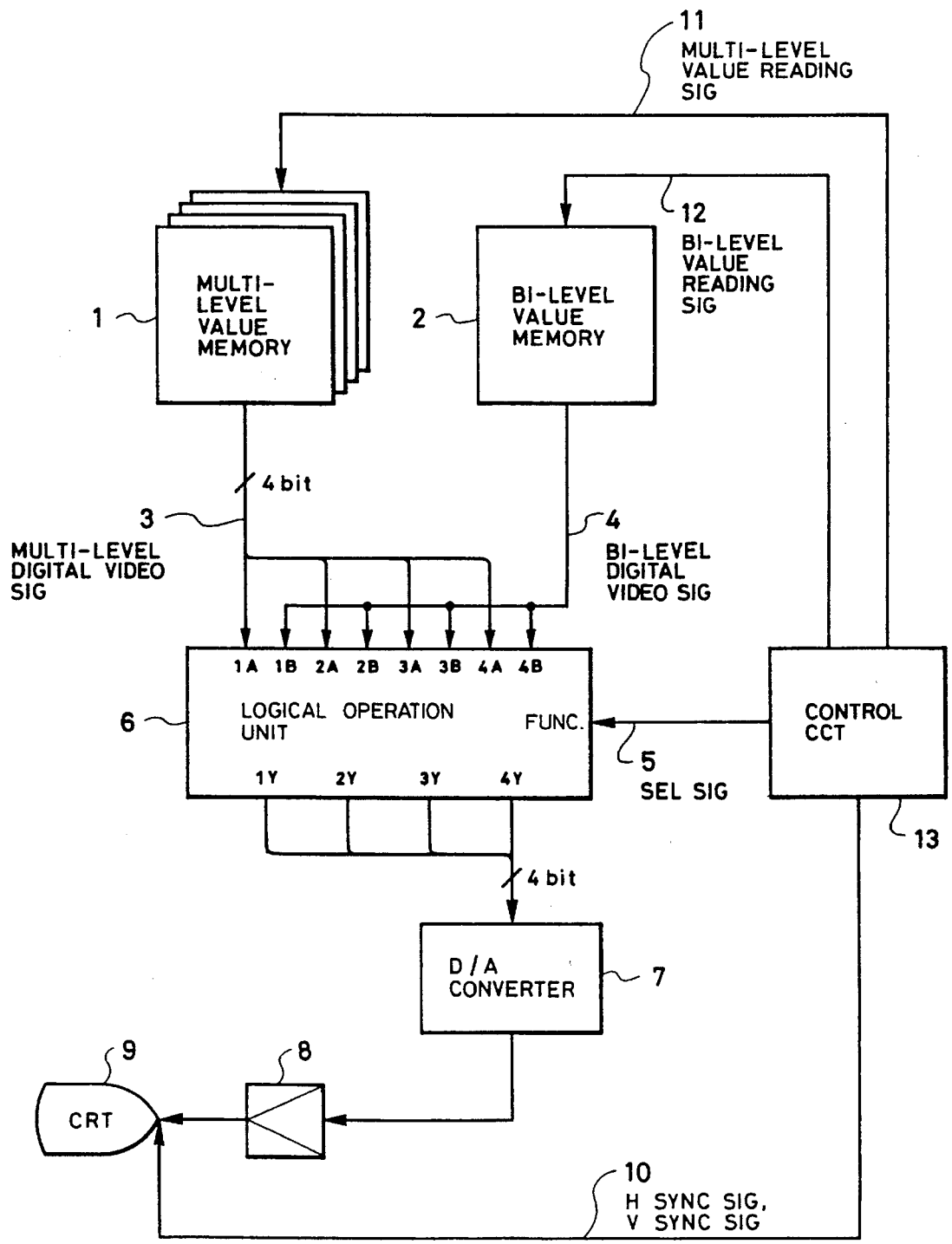

The above operation applies to the case wherein bi-level digital video data is displayed in the multi-level digital video data, as shown in FIG. 6.

In FIG. 6, a selection signal 5 instructs to select the type of logical operation for the multi- and bi-level digital video signals 3 and 4. A logical operation unit 6 performs a logical operation between the multi- and bi-level digital video signals 3 and 4. Other arrangements in FIG. 6 are the same as those in FIG. 1.

Figures 10, 11:
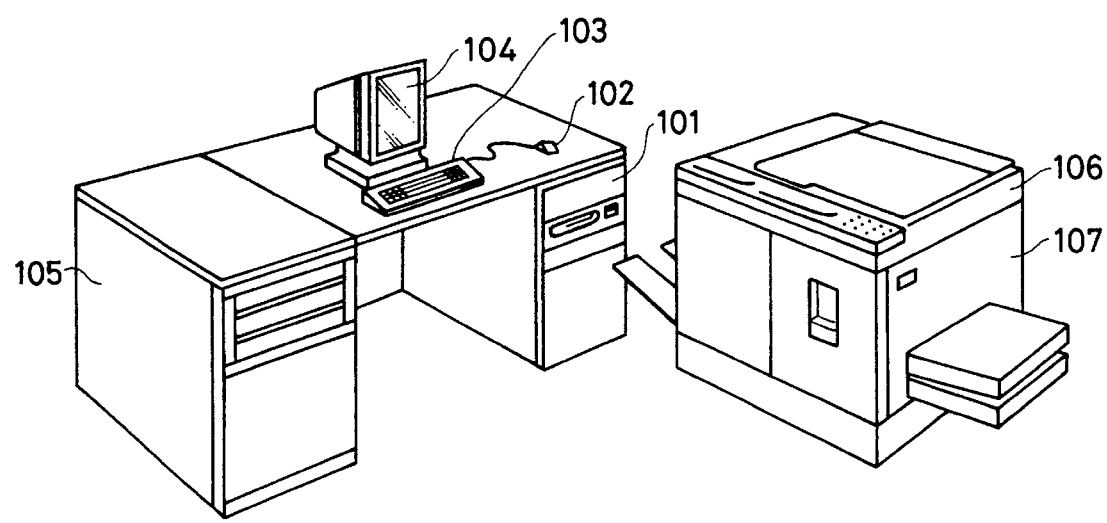
FIG. 10 is a table showing actual results of the logical operations.
FIG. 11 is a perspective view of an image data processing system according to another embodiment of the present invention.

FIGS. 7 and 8 show techniques for supplying the selection signal 5 shown in FIG. 6. FIG. 9 shows a relationship between the selection signals and the types of logical operations. FIG. 10 shows actual results of the logical operations.

As shown in FIG. 7, if the type of logical operation is to be changed in the rectangular area, parameters WX, WY, WW, and WH are preset. When the multi- and bi-level value reading signals 11 and 12 are output in response to the sync signals 10, the multi- and bi-level digital video signals 3 and 4 are respectively output from the multi- and bi-level value memories 1 and 2. When the selection signal 5 is set at "0", the AND operation between the multi- and bi-level digital video signals 3 and 4 is performed by the logical operation unit 6. When the selection signal 5 is set at "1", the OR operation per bit between the multi- and bi-level digital video signals is performed by the logical operation unit 6. Furthermore, if area assignment of the control memory is determined as described above, and the contents of the control memory serve as the selection signals 5, four logical operations in FIG. 9 can be performed by areas (see FIG. 8). An output from the logical operation unit 6 is converted by a D/A converter 7, and an analog signal from the D/A converter 7 is amplified by an amplifier 8. An output from the amplifier 8 is displayed on a CRT 9. Other logical operations in addition to those shown in FIG. 9 may be used. If one of the multi- and bi-level video signals 3 and 4 has a priority over the other, switching between the multi- and bi-level values can be performed as described above. Negative/positive conversion can be easily performed by bit inversion.

FIG. 11 is a perspective view of an image data processing system according to a second embodiment of the present invention. The image data processing system recognizes a multi-level value image area and a bi-level value image area in an original image and stores the multi- and bi-level value data.

The image data processing system includes a controller 101, a keyboard 103, a CRT 104, an optical disk (to be referred to as an OD hereinafter) 105, an image scanner 106, and an image printer 107. A pointing device 102 such as a mouse is connected to the keyboard 103. The CRT 104, the keyboard 103, and the pointing device 102 constitute an operation unit. The controller 101 controls the OD 105, the image scanner 106, and the image printer 107 in accordance with a command from the operation unit and performs image processing. It should be noted that the CRT 104 preferably has a high resolution (1000 DPI or dots per inch in this embodiment).

Figure 12:
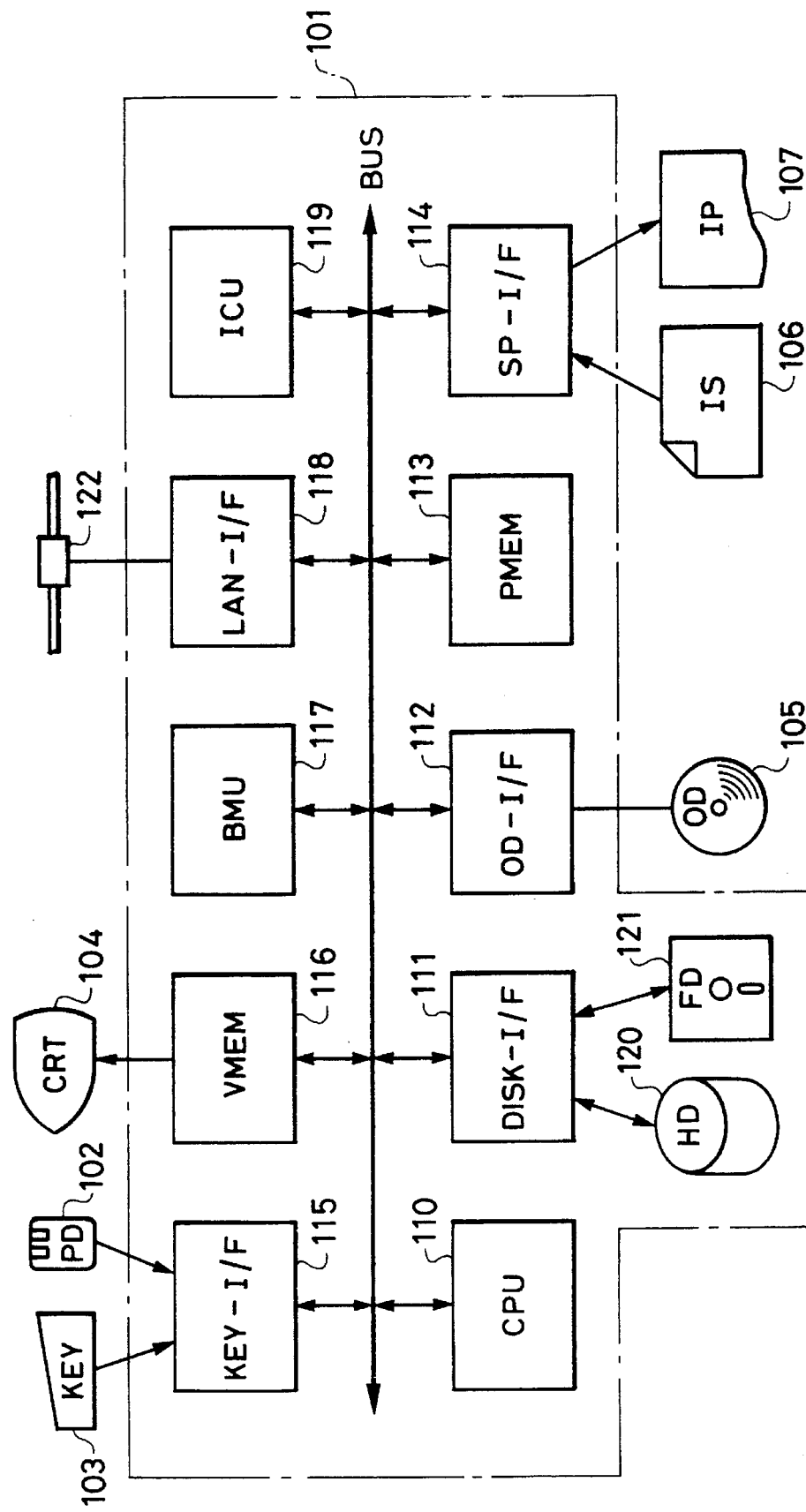
FIG. 12 is a block diagram of the image data processing system shown in FIG. 11.

FIG. 12 is a block diagram of the image data processing system shown in FIG. 11. A portion surrounded by the alternate long and short dashed line in FIG. 12 defines the controller 101. A CPU (central processing unit) 110 executes control programs stored in a PMEM (program memory). 113 and controls the image data processing system. The PMEM 113 stores the control programs and various control data such as a control flag. The control programs are shown in FIGS. 17 to 20.

A DISK-I/F (disk interface) 111 controls an HD (hard disk) 120 and an FD (floppy disk) 121 in accordance with an instruction from the CPU 110. The control programs to be stored in the PMEM 113 may be loaded from the HD 120 or the FD 121.

An OD-I/F (optical disk interface) 112 controls the OD 105 in accordance with an instruction from the CPU 110.

An SP-I/F (scanner/printer interface) 114 controls the IS (image scanner) 106 and the IP (image printer) 107 in accordance with an instruction from the CPU 110. The detailed arrangement of the SP-I/F 114 will be described in FIG. 14.

A KEY-I/F (keyboard interface) 115 serves as an interface for signalling operating states of the keyboard (KEY) 103 and the PD (pointing device) 102 to the CPU 110. The CPU 110 detects an operating state of the PD 102 and controls the position of a cursor displayed on the CRT 104 to be described later.

A VMEM (video memory) 116 stores image data displayed on the CRT 104. The VMEM 116 reads out image data in response to a sync signal for the CRT 104 and converts the image signal into a raster signal. The raster signal is supplied to and displayed as an image on the CRT 104.

A LAN-I/F (local area network interface) serves as an interface for exchanging data with other devices through a LAN (local area network) 122.

An ICU (image compression unit) 119 is a unit for compressing or expanding an image according to an MMR (modified modified READ) scheme used in a FAX (facsimile system). The ICU 119 is used to store an image in the OD 105.

BMU Function

A BMU (bit manipulation unit) 117 transfers image data in a rectangular shape and performs image processing such as enlargement, reduction, or rotation. The BMU 117 also performs logical operations between the transfer source image data and the transfer destination image data. The logical operations are logical AND and OR operations between pixels. All the above image processing operations can be performed at bit boundaries.

Figure 13A:
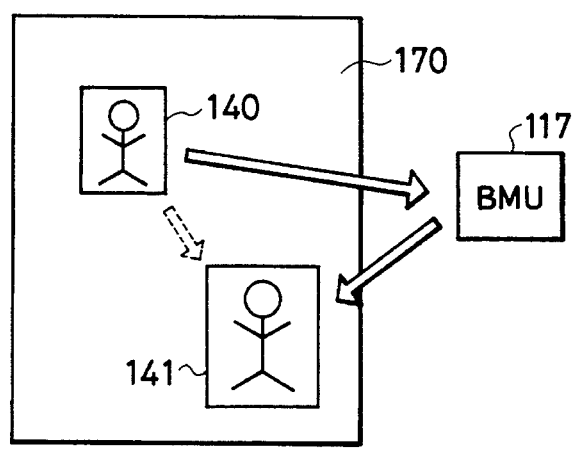
FIG. 13A is a view for explaining operation (shift) of a BMU 117 shown in FIG. 12.

FIG. 13A is a view for explaining image enlargement/ transfer as an operation of the BMU 117 shown in FIG. 12. An image memory 170 corresponds to IMEMs 131 and 132 to be described later. Image data of a transfer source area 140 in FIG. 13A is enlarged through the BMU 117 and the enlarged image data is transferred to a transfer designation area 141.

Figure 13B:
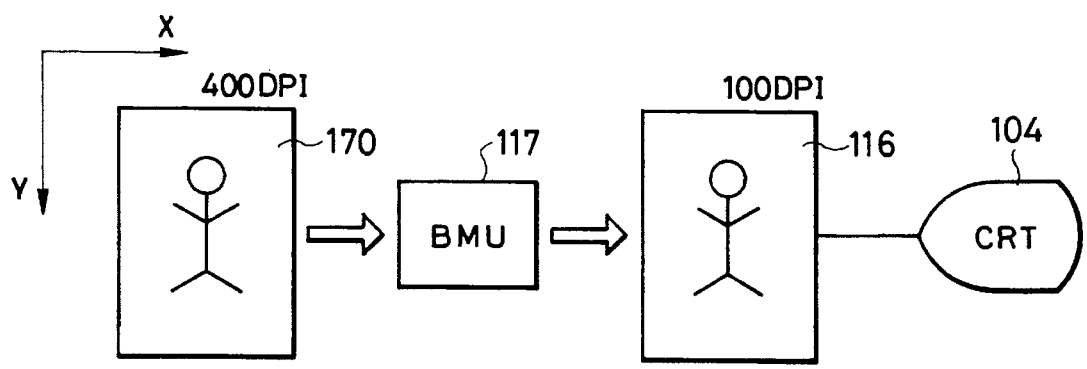
FIG. 13B is a view for explaining operation (extraction) of the BMU 117 shown in FIG. 12.

FIG. 13B shows another application of the BMU 117 in FIG. 12. An image data extraction function is effected such that a 400-DPI image is displayed on the CRT 104 (whose resolution is 100 DPI or dots per inch in this embodiment). If image data having a resolution of 400 DPI is stored in the image memory 170, it is read out and extracted to reduce the number of DPI to ¼ of the original value. The image signal is thus converted into image data having a resolution of 100 DPI. The 100-DPI image data is transferred to the VMEM 116 for displaying it on the CRT 104. In this case, the BMU 117 extracts three pixels of every four pixels in both X and Y directions, thereby reducing the image data to ¼ in each direction. In this embodiment, the 400-DPI image read by the IS 106 is displayed and monitored on the CRT 104 because the operator can visually distinguish the bi-level value image area from the multi-level value image area in the read image.

SP-I/F Function

Figure 14:
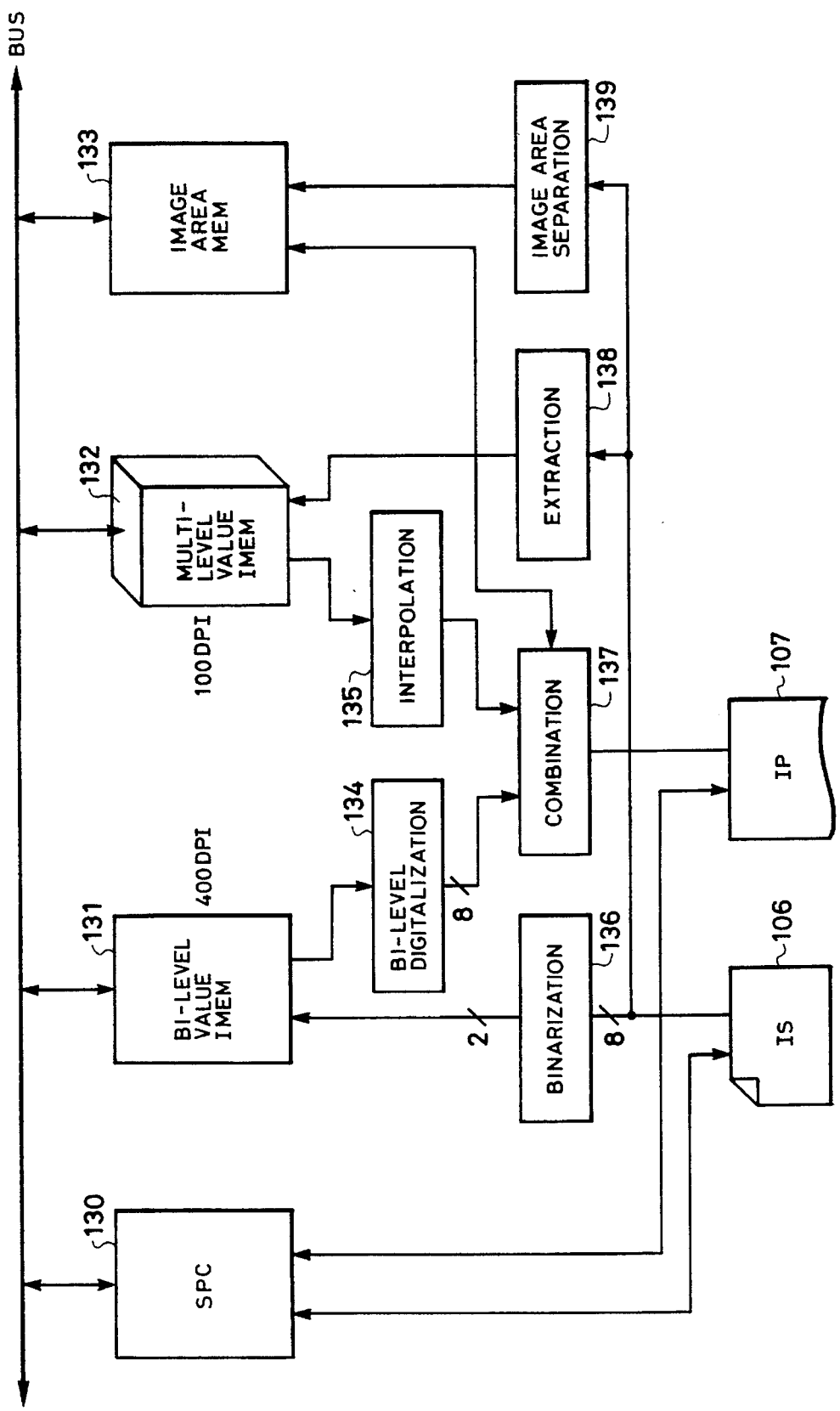
FIG. 14 is a block diagram showing the detailed arrangement of an SP-I/F 114 shown in FIG. 12.

The function of the SP-I/F 114 is the characteristic feature of this embodiment. FIG. 14 is a block diagram showing the detailed arrangement of the SP-I/F 114 in FIG. 12. Referring to FIG. 14, an SPC (scanner/printer controller) 130 having a control function communicates with the IS 106 and the IP 107 in accordance with an instruction from the CPU 110 and controls circuits (to be described later) in the SP-I/F 114.

A bi-level value IMEM (bi-level value image memory) 131 stores bi-level value image data and has a bit density of 400 DPI. A multi-level value IMEM (multi-level value image memory) 132 stores multi-level value image data and has a pixel density of 100 DPI. An image area MEM (image area memory) 133 stores image recognition data for recognizing the character (bi-level value)/photograph (halftone) image area and has a bit density of 400 DPI.

An output operation (i.e., output to the printer (IP) 107) is taken into consideration. A bi-level digitalizing circuit 134 converts bi-level value image data stored in the bi-level value IMEM 131 into 8-bit multi-level value data. "0" is converted to "0", and "1" is converted to "255" according to MIN/MAX conversion. An interpolating circuit 135 linearly interpolates the multi-level value image data stored in the multi-level value IMEM 132 and having a resolution of 100 DPI and converts it into multi-level value image data having a resolution of 400 DPI. A combining circuit 137 selectively combines image data from the bi-level digitalizing circuit 134 and the interpolating circuit 135 in accordance with the image recognition data from the image area MEM 133. The combining circuit 137 also calculates a logical OR or AND of the image data from the bi-level digitalizing circuit 134 and the interpolating circuit 135 in accordance with an instruction from the SPC 130. Therefore, the image data output from the bi-level value IMEM 131, the multi-level value IMEM 132, and the image area MEM 133 are finally set to be 400 DPI. In the SP-I/F 114, the bi- and multi-level value images are neither compressed nor expanded at the time of output/reproduction. Since the image area MEM 133 has a bit density of 400 DPI, the bi-level value image stored in the bi-level value IMEM 131, the multi-level value image stored in the multi-level value IMEM 132, and the image recognition data stored in the image area MEM 133 and representing the type of image are given in one-to-one correspondence. Of the reproduced images output to the IP 107, the bi-level value image component corresponds to the bi-level value image data stored in the bi-level value IMEM 131 and the multi-level value image component corresponds to the multi-level value image data stored in the multi-level value IMEM 132.

Input to SP-I/F

An input from the image scanner (IS) 106 will be described below. The IS 106 causes a CCD or the like to read document data and converts the read data into a digital signal, thereby outputting multi-level digital image data representing halftone data according to 256 gray scale levels. The binarizing circuit 136 compares 8-bit 400-DPI multi-level value image data from the IS 106 with a predetermined slice level (a fixed threshold value) and converts the multi-level value data into 400-DPI bi-level value image data. The resultant image data is stored in the bi-level value IMEM 131.

The extraction circuit 138 receives multi-level value image data having a resolution of 400 DPI from the IS 106 and calculates an average density of 16 (=4×4) pixels. The average density is defined as a density of one pixel, and the 400-DPI multi-level value image data is converted into 100-DPI image data. In this way, the 8-bit data/dot is stored in the multi-level value IMEM 132.

The image area separating circuit 139 analyzes the features of the multi-level value image from the IS 106 and separates the image into character and photographic areas. Image recognition data of logic "0" is assigned to character areas, and that of logic "1" is assigned to photographic areas. The data are stored in the image area MEM 133 corresponding to each pixel (dot). In this case, it should be noted that data are parallelly or simultaneously input to the bi-level value IMEM 131, the multi-level value IMEM 132, and the image area MEM 133. The image recognition data is stored in the image area MEM 133 by the image area separating circuit 139. In addition, the image recognition data is stored as follows. The operator designates a halftone image area with the pointing device 102 while observing an image monitored on the CRT 104, and image recognition data associated with the designated area is written in the image area MEM 133 through a bus under the control of the CPU 110.

In the image area separating circuit 139, an 8-bit image signal (8 bits per pixel) read by the IS 106 is filtered by a differential filter or the like. If a sum of filtered outputs within the predetermined area exceeds a predetermined value, the central pixel within the predetermined area is detected as a pixel of bi-level value image. In this case, the value for the image area MEM 133 which corresponds to the predetermined area is set to be "0".

The bi-level value image data stored in the bi-level value IMEM 131 is most suitable for bi-level value images such as character images. The image data stored in the multi-level value ITEM 132 is most suitable for halftone images. If an image such as a photograph is stored in the bi-level value IMEM 131, or a bi-level value image is stored in the multi-level value IMEM 132, it is not suitable to output the stored contents without conversion. However, in this embodiment, the image areas can be switched in response to the image recognition data.

The above description has been made for the overall arrangement of this embodiment. This embodiment will be described in more detail below. Two operation modes, two input modes for inputting images from the IS 106 while image recognition data is being input to the image area MEM 133, each output mode for outputting image information to the IP 107 or CRT 104 in accordance with the recognition data stored in the image area MEM 133, and an application with an optical disk will be exemplified below.

Figure 15:
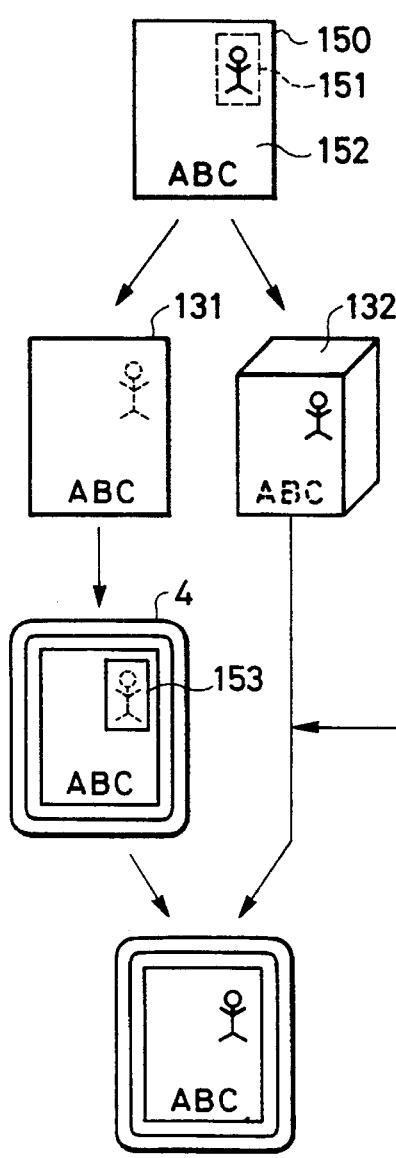
FIG. 15 is a view for explaining a technique for causing an operator to designate a character area and a photographic area.

Operation Mode: FIG. 15

Referring to FIG. 15, an image 150 including a character portion 152 and a photographic portion 151 is read by the IS 106 and the read image components are stored in the bi- and multi-level value IMEMs 131 and 132. The data stored in the bi-level value IMEM 131 is displayed on the CRT 104. The operator can designate a photographic area 153 while visually observing the image displayed on the CRT 104. Image recognition data of "1" corresponding to the area 153 is defined as data 154 in the image area MEM 133. The character portion is read out from the bi-level value IMEM 131, and the photographic portion is read out from the multi-level value IMEM 132, and the composite image is displayed on the CRT 104.

As described above, in a state wherein corresponding data are stored in the bi- and multi-level value IMEMs 131 and 132, the bi-level value image data stored in the bi-level value IMEM 131 has good reproducibility of characters but poor reproducibility of a photograph. The multi-level value image data stored in the multi-level value IMEM 132 has good reproducibility of a photograph but poor reproducibility of characters.

An excellent image including character and photographic portions is finally displayed on the CRT 104.

Figure 16:
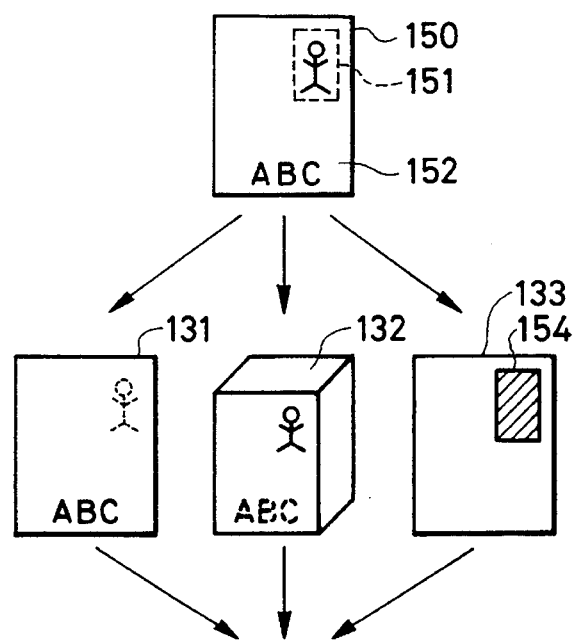
FIG. 16 is a view for explaining a technique for causing an image area separating circuit 139 to automatically designate a character area and a photographic area without designation by an operator.

Operation Mode: FIG. 16

Necessary data read by the IS 106 and stored in the bi-level value IMEM 131, the multi-level value IMEM 132, and the image area MEM 133 are parallelly or simultaneously read out in accordance with the image recognition data 154 stored in the image area MEM 133. An image having character and photographic portions having high quality is displayed on the CRT 104. In this case, the recognition data 154 stored in the image area MEM 133 is automatically generated by the image area separating circuit 139 without a manual operation.

Figure 17:
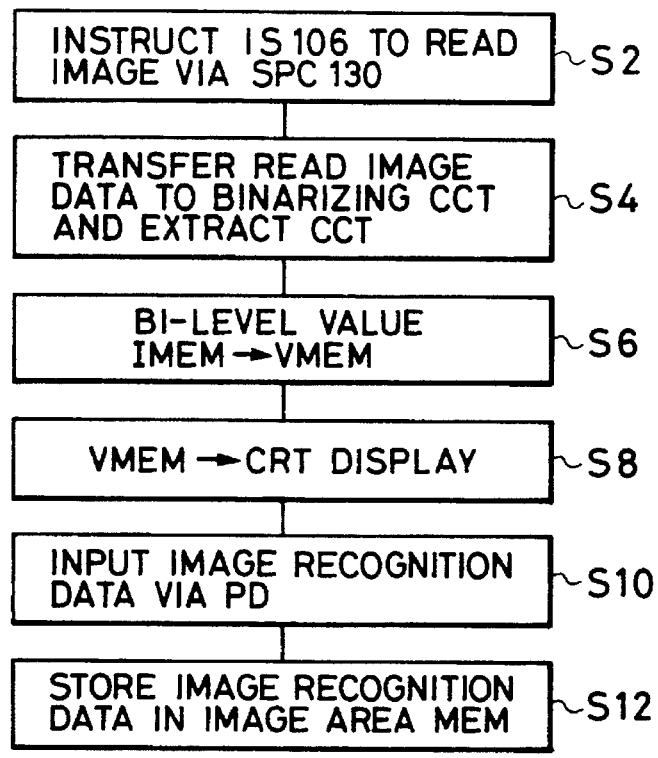
FIGS. 17 to 20 are flow charts for explaining the control sequence of the image data processing system shown in FIG. 11.

Input Control Sequence: FIG. 17

Referring to FIG. 17, an image 150 is read by the IS 106 and the read image components are stored in the bi- and multi-level value IMEMs 131 and 132. The data stored in the bi-level value IMEM 131 is displayed on the CRT 104, and the operator designates the photographic area 153 while visually observing the image displayed on the CRT 104. Image recognition data corresponding to the area 153 is stored in the image area MEM 133.

In step S2, the CPU 110 instructs the IS 106 to read the image via the IS 106. The SPC 130 communicates with the IS 106 and instructs the IS 106 to read the image. The contents of step S4 are performed in the SP-I/F 114, as described above. The IS 106 reads the image in accordance with the instruction and outputs 8-bit (per dot) 400-DPI multi-level value image data. This data is simultaneously supplied to the binarizing circuit 136 and the extract circuit 138. The image data binarized by the binarizing circuit 136 is stored in the bi-level value IMEM 131 as the bi-level value image data having a resolution of 400 DPI. The image data, the resolution of which is converted by the extraction circuit 138, is stored in the multi-level value IMEM 132 as the multi-level value image data having a resolution of 100 DPI. The bi-level value image data from the bi-level IMEM 131 is resolution-converted by simple extraction by means of the BMU 117. As a result, 100-DPI bi-level value data for the CRT 104 is transferred to the VMEM 116 in step S6 and is displayed on the CRT 104 in step S8.

The operator manipulates the PD 102 to designate the photographic portion 151 while visually observing the image on the CRT 104 and designates the photographic area or frame 153 (step S10).

Image recognition data corresponding to the designated photographic area is stored in the image area MEM 133 (step S12).

Figure 18:
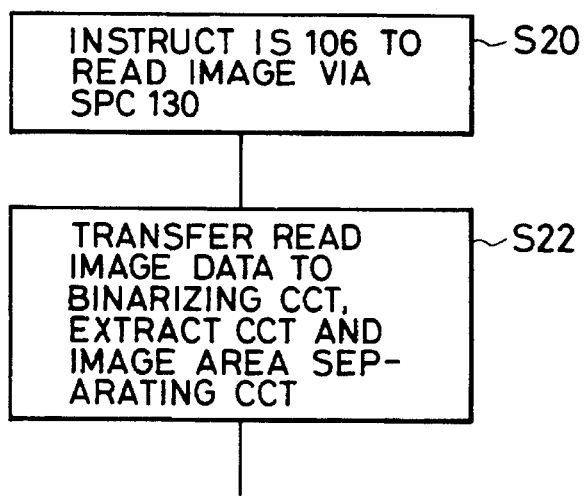

Input Control Sequence: FIG. 18

Unlike in the control sequence of FIG. 17, FIG. 18 shows a control sequence for automatically obtaining image recognition data without a manual operation. The operation in step S20 is the same as that of step S2 in FIG. 17. When the original or image 150 including the photographic and character portions 151 and 152 is read in step S22, the read image components are simultaneously stored in the bi- and multi-level value IMEMS 131 and 132 through the binarizing circuit 136 and the extract circuit 138. The image recognition data recognized by the image area separating circuit 138 is also stored in the image area MEM 133. The image recognition data 154 corresponding to the photographic portion 151 is set at logic "1".

The input sequences of this embodiment have been described above. The input sequences allow a large decrease in the number of multi-level value image data input from the IS 106, and the resultant multi-level value image data is stored in the image memory, which is a characteristic feature of this embodiment. The bi-level value image can be compressed without sacrificing its resolution by its nature. Even if the resolution is degraded, no problem occurs in the multi-level value image. Therefore, the number of bits of the images can be reduced by sacrificing the resolution.

Figure 19:
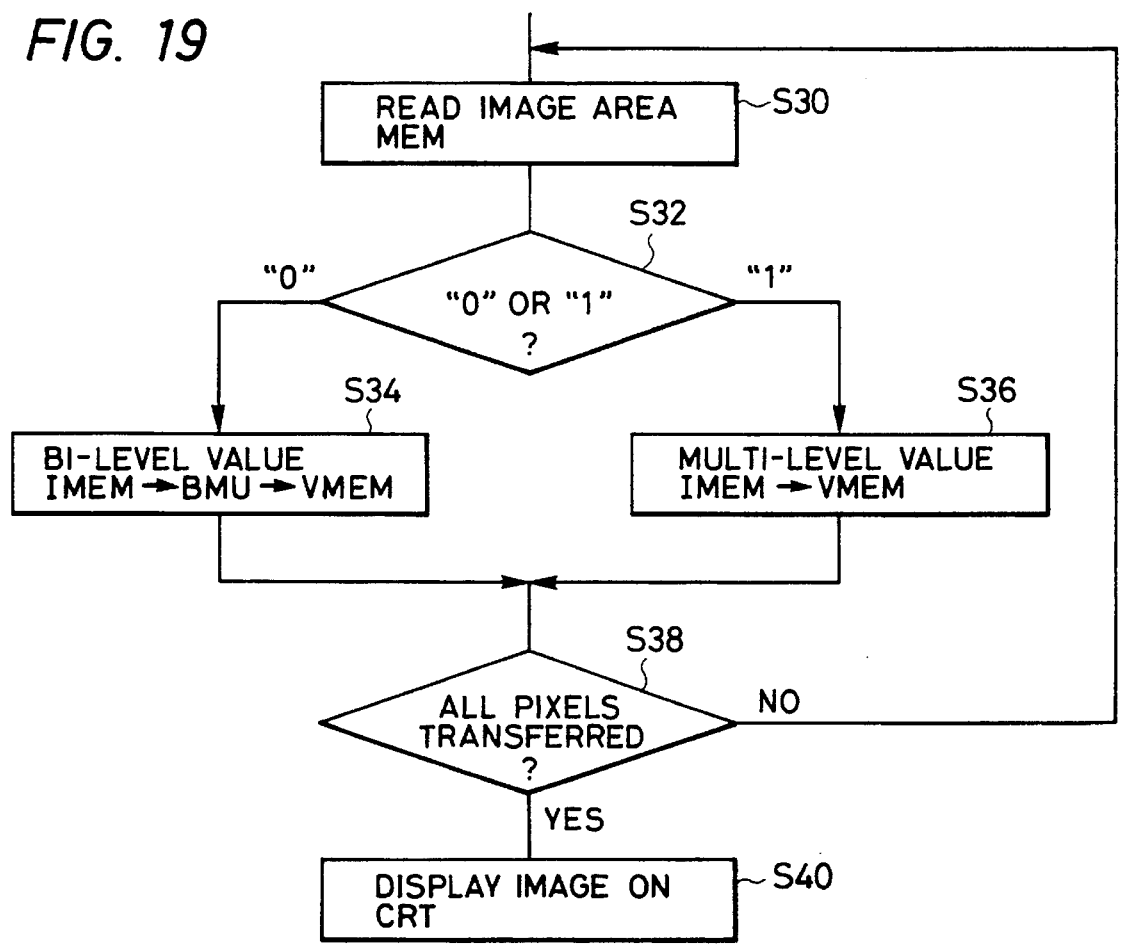

Output to CRT 104: FIG. 19

A sequence for outputting data to the CRT 104 will be described with reference to FIG. 19. Predetermined data are stored in the bi-level value IMEM 131, the multi-level value IMEM 132, and the image area MEM 133. In step S30, the contents of the image area MEM 133 are read out pixel by pixel. The CPU 110 determines in step S32 whether the contents represent "0" or "1". If "0" is determined, the contents represent the bi-level value image (i.e., a character image). In step S34, the CPU 110 causes the BMU 117 to convert the 400-DPI bi-level value image data in the bi-level value IMEM 131 into 100-DPI data (FIG. 13B). The 100-DPI data is transferred to the VMEM 116. However, if the image recognition data is set at "1", the multi-level value image data in the multi-level value IMEM 132 is transferred to the VMEM 116 in step S36. In this case, since the VMEM 116 comprises a multi-level value memory having a resolution of 100 DPI, the multi-level value image data has a resolution of 100 DPI accordingly. Therefore, data can be transferred without resolution conversion. In this manner, if data of all pixels are transferred to the VMEM 116 (step S38), the image is displayed on the CRT 104 in step S40.

Figure 20:
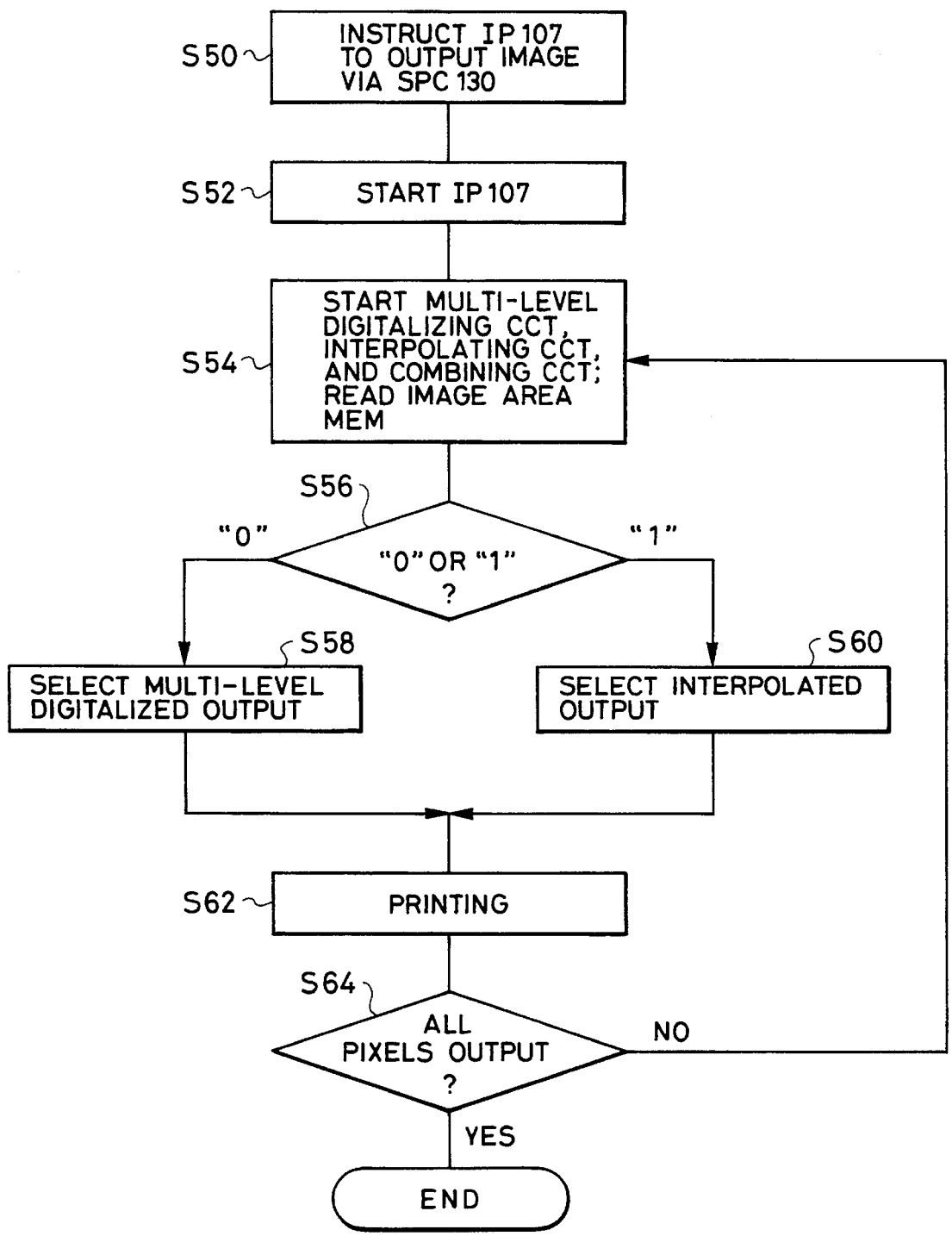

Output to Printer (IP) 107: FIG. 20

A sequence for outputting data to the IP 107 will be described with reference to a flow chart in FIG. 20. Assume that predetermined data are stored in the bi-level value IMEM 131, the multi-level value IMEM 132, and the image area MEM 133.

When the CPU 110 instructs the IP 107 to output an image via the SPC 130 in step S50, the SPC 130 communicates with the IP 107 to start the IP 107 in step S52. The CPU 110 instructs circuits in the SP-I/F 114 to start outputting an image signal in synchronism with the IP 107 and reads out the contents of the image area MEM 133 pixel by pixel step S54. The bi-level value image data having a resolution of 400 DPI read out from the bi-level value IMEM 131 is converted into 8-bit multi-level value image data by the bi-level digitalizing circuit 134 in step S58. The converted data is supplied to the combining circuit 137. The 8-bit multi-level value image data having a resolution of 100 DPI and read out from the multi-level value IMEM 132 is resolution-converted into the 400-DPI multi-level value data by the interpolating circuit 135 (step S60). The image recognition data for designating the character or photographic portion is read out from the image area MEM 133 and is input to the combining circuit 137.

In steps S56 to S62, the combining circuit 137 selects one of the digitalized and interpolated outputs from the digitalizing circuit 134 and the interpolating circuit 135 on the basis of the image area designation data read out from the image area MEM 133. An output image signal is then output to the IP 107. This image signal is printed on paper at the IP 107 in synchronism with the operation of the IP 107. In the IP 107, the 8-bit (per pixel) multi-level value data is converted into analog data and the width of the ON pulse of the laser can be changed, thereby printing out a halftone electrophotographic picture expressed in 256 gray scale levels.

Figure 21:
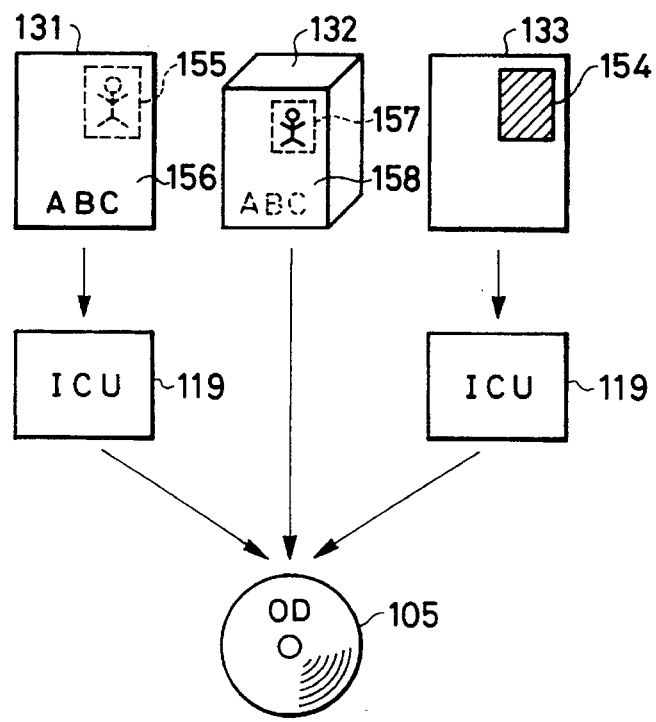
FIG. 21 is a view for explaining recording of an image including character and photographic areas in an OD 105.

Application with/Recording of Optical Disk: FIG. 21

FIG. 21 shows an application in which an image including both character and photographic areas is recorded in the OD (or optical disk) 105. This operation is performed in association with the DISK-I/F 111, the ICU 119, the SP-I/F 114, and the bus BUS.

Image data associated with the bi-level value image area, image data associated with the multi-level value area, image recognition data, and header data for discriminating the image data from image recognition data are simultaneously stored in the OD 105. In this case, only a character area 156 excluding a photographic area 155 from the data in the bi-level value IMEM 131 is compressed by the ICU 119, and predetermined header data H1 is added to the compressed data, and the composite data is stored in the OD 105. Predetermined header data H2 is added to only a photographic area 157 excluding a character area 158 in the multi-level value IMEM, and the composite data is stored in the OD 105. Since the resolution of the multi-level value image data is compressed to ¼, the quantity thereof is compressed to ¹⁄₁₆. A further data compression operation is not performed. The image recognition data stored in the image area MEM 134 is compressed by the ICU 119 and is defined by predetermined header data H3. The above data are controlled as a single image file in association with the header data.

Compression of data excluding a specific area can be performed by the logical AND function of the BMU 117 together with the ICU 119. Control data (not shown) including the header data is stored in the HD 120.

Figures 1, 22:
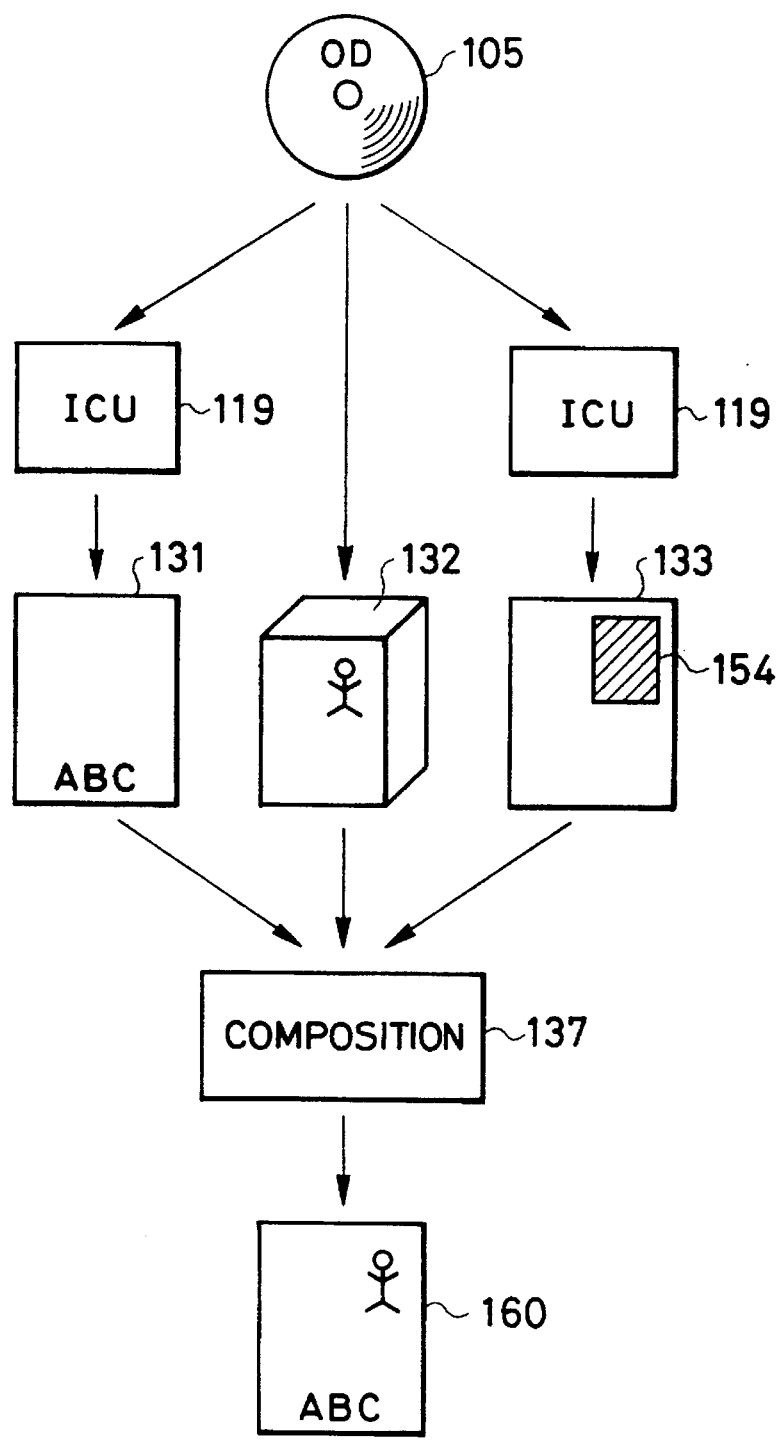
Figures 2, 22:
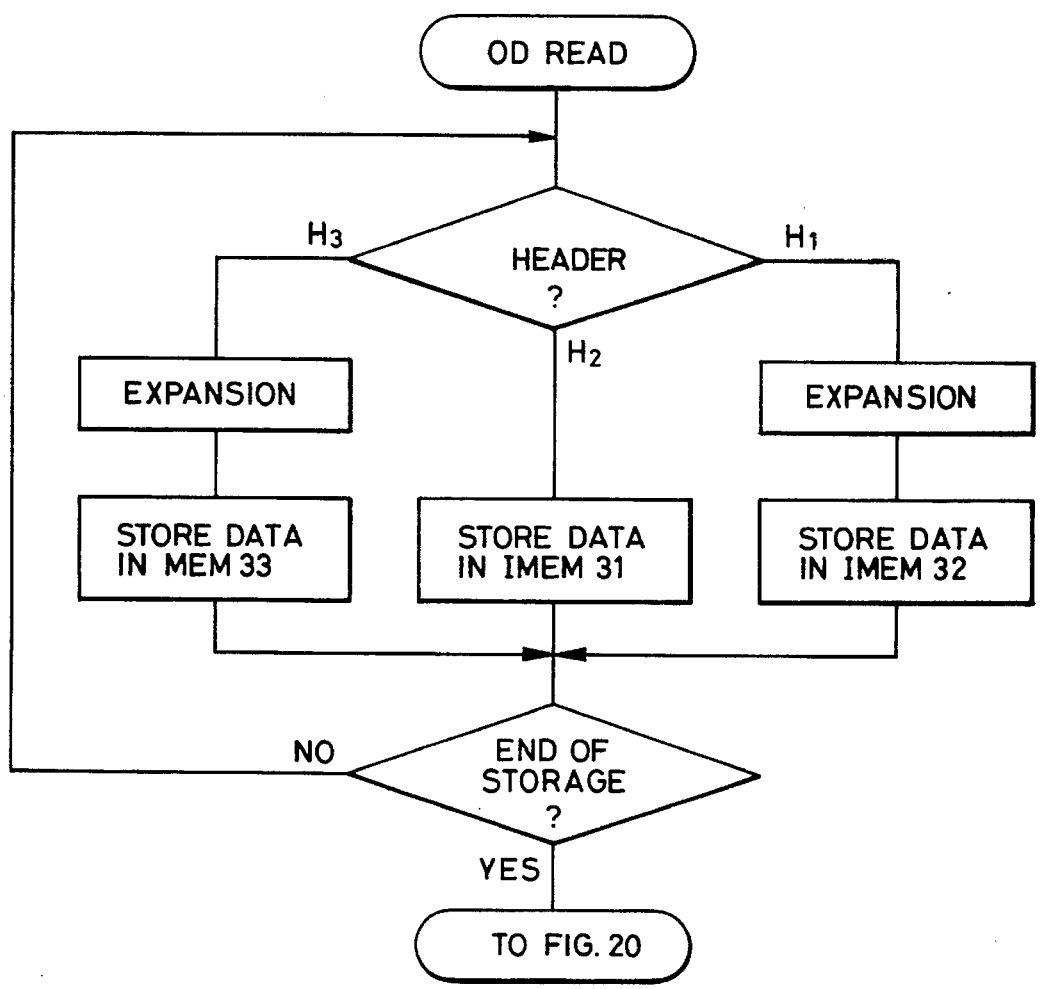

Application with/Reading of Optical Disk: FIGS. 22-1 and 22-2

FIGS. 22-1 and 22-2 show a sequence for outputting image data from the OD 105. A desired optical disk file is detected by the control data stored in the HD 120.

When header data H1 is read, bi-level value image data is read out from the OD 105 and is expanded by the ICU 119. The expanded data is stored in the bi-level value IMEM 131. When the header data H3 is read, the image recognition data is read out from the OD 105 and is expanded by the ICU 119. The expanded data is stored in the image area MEM 133.

When the expanded data are to be printed out, the corresponding data are read out from the memories in synchronism with the operation of the IP 107 and are combined by the combining circuit 136. The area of the image area MEM 133 which is assigned "1" represents the photographic area 154. As for the photographic area, data is read out from the multi-level value IMEM 132. As for the remaining area, data is read out from the bi-level value IMEM 131. The resultant combined image is output to the IP 107. Therefore, an image including character and photographic areas having high quality can be obtained.

In the above embodiment, the image scanner is used as a multi-level value image data input means. However, another input device such as a TV camera or a flying spot scanner may be used.

A laser beam printer, an ink-jet printer, a thermal printer or the like may be used as a multi-level value printer.

In the above embodiment, a random access memory is used as a memory for storing image recognition data. However, start/end point data of the x- and y-coordinates of the photographic area (halftone) may be stored in registers.

In the above embodiment, the multi-level value image data is resolution-converted, and the 100-DPI converted data is stored in the memory. However, the resolution of the converted image data may be, for example, 200 DPI.

Various changes and modifications may be made within the spirit and scope of the present invention.

Figure 23:
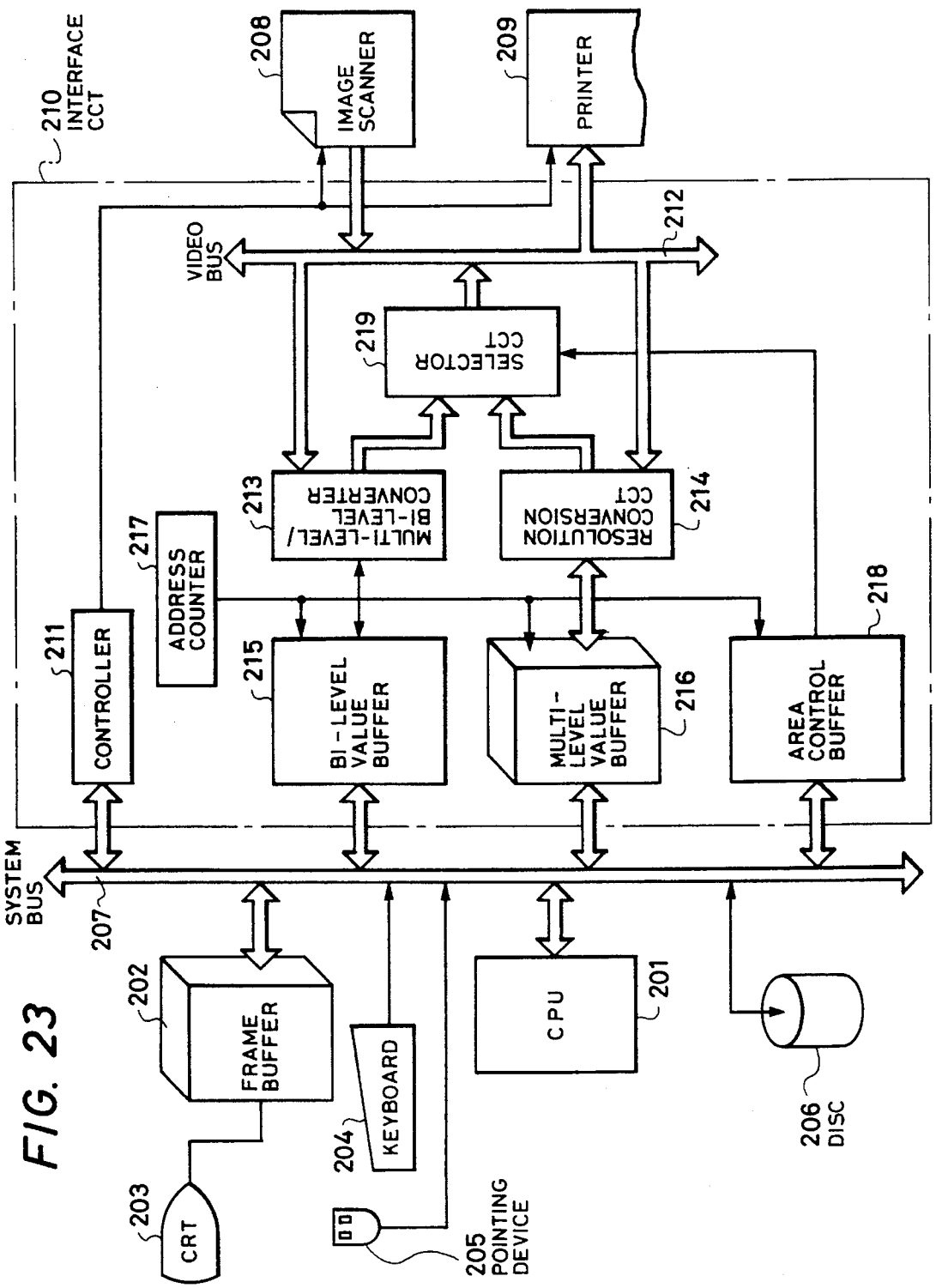
FIG. 23 is a block diagram of an image processing system employing an interface circuit according to still another embodiment of the present invention.

FIG. 23 shows an image processing system using an interface circuit according to a third embodiment of the present invention.

A CPU 201 serves as a host computer processor and includes a main memory adapted to store control programs and used as a work area. A frame buffer 202 stores image data of at least one frame. A CRT 203 displays image data from the frame buffer 202 and contents of inputs from a keyboard 204 and a pointing device 205. The keyboard 204 is used to input various commands and control data. The pointing device (PD) 205 is used to designate a specific area of an image displayed on the CRT 203. A disc drive 206 stores image data input from an image scanner 207 or the like. A system bus 207 connects the CPU 201 to various buffers. The CPU 201 can access each buffer via the system bus 207. These components are included in the host computer side.

An image scanner 208 photoelectrically reads image information and inputs it as multi-level value image data. A printer 209 prints a multi-level value image on paper.

An interface circuit 210 is controlled by a controller 211. The multi-level value data from the image scanner 208 is simultaneously input to a multi-level/bi-level converter 213 and a resolution conversion circuit 214 via a video bus 212. In the multi-level/bi-level converter 213, the input multi-level value data is converted into bi-level value data in accordance with threshold value processing. The resultant bi-level value data is stored in a bi-level value buffer 215. The resolution conversion circuit 214 extracts the input multi-level value data and converts it into data having a lower resolution. The converted data is stored in a multi-level value buffer 216.

When the image data is output to the printer 209, the bi-level value data in the bi-level value buffer 215 is min/max-converted by the multi-level/bi-level converter 213 into multi-level value data. The multi-level value data in the multi-level value buffer 216 is subjected to interpolation by the resolution conversion circuit 214. Low-resolution data is expanded so that its dot density coincides with that of the multi-level value data from the multi-level/bi-level converter 213. An address counter 217 generates read/write address data for the multi-level value buffer 216 and an area control buffer 218. A switching or selector circuit 219 switches between the image data from the multi-level/bi-level converter 213 and the resolution conversion circuit 214 in accordance with area data 220 from the area control buffer 218 when the image data are output.

When the bi-level or multi-level value image area is designated with the PD 205 in the image displayed on the CRT 203, the area control buffer 218 stores the data in the area control buffer 218 such that "1" is assigned to the bi-level value area and "0" is assigned to the multi-level value area. The area control buffer 218 outputs area data 220 of logic "0" or "1" in synchronism with read access of the bi-level or multi-level value buffer 215 or 216.

Description of Image Editing Application: FIGS. 24A to 25(e)

Figure 24A:
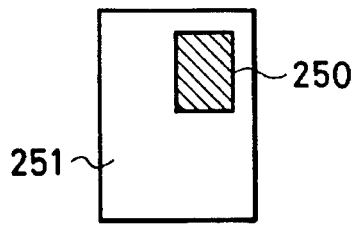
FIG. 24A is a view showing image data input from an image scanner.
Figure 24B:
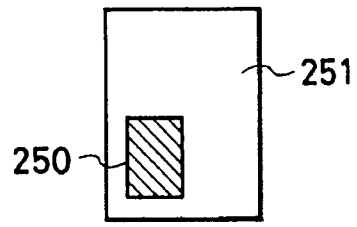
FIG. 24B is view showing print-out image data representing that the photographic area of image data of FIG. 24A is shifted.
Figure 25:
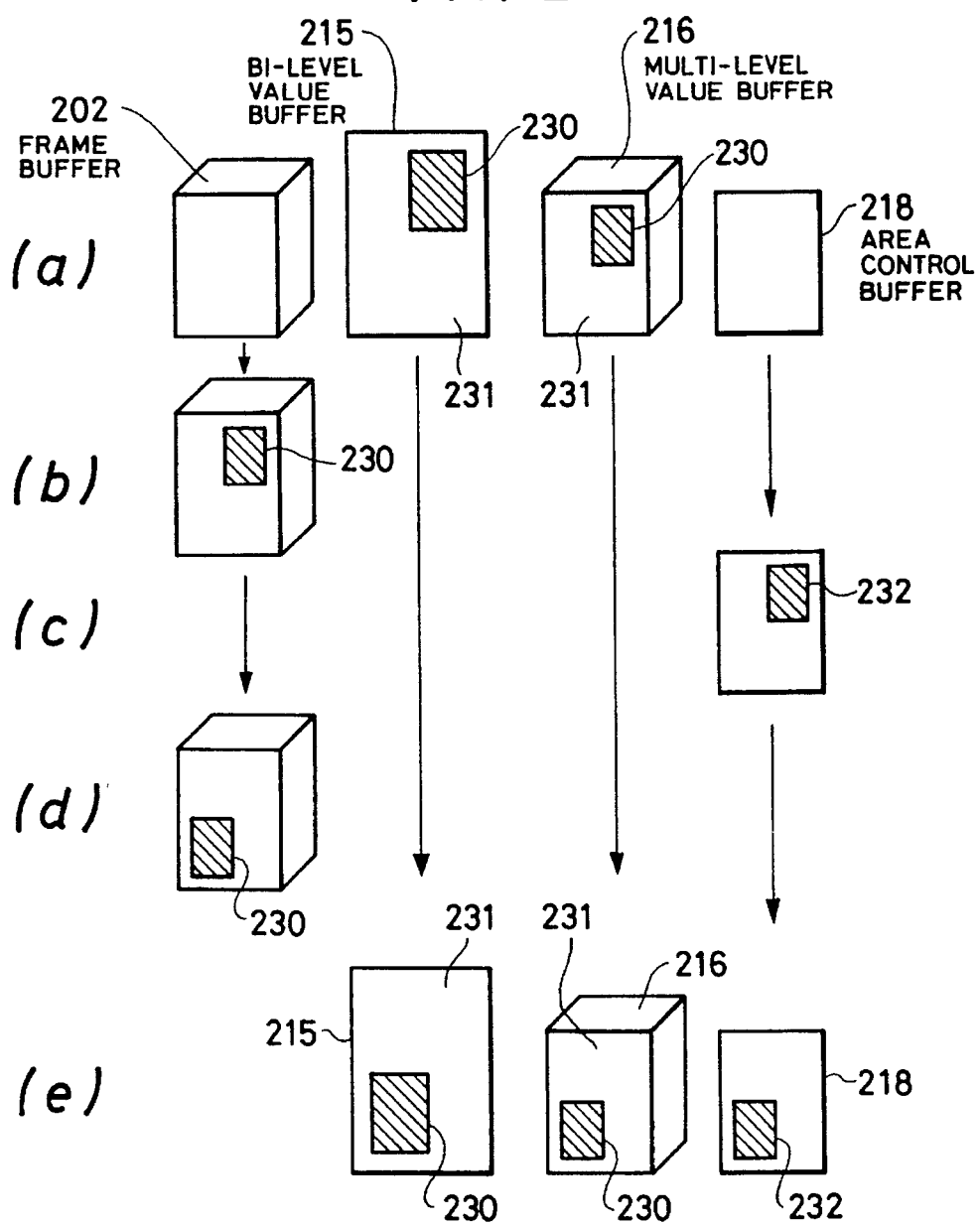
FIGS. 25(a) to 25(e) are views showing image editing procedures and changes in states of buffers during image editing.

FIG. 24A shows image data input from the image scanner 208. This image includes a photographic area 250 and a character area 251. FIG. 24B shows print-out image data in which the photographic area 250 is shifted.

Image input operations, the states of buffers at the time of image output, and operations during image shifting will be described with reference to FIGS. 25(a) to 25(e).

When multi-level value image data is input from the image scanner 208, the bi-level value data output from the multi-level/bi-level value converter 213 is stored in the bi-level value converter 215. At the same time, the multi-level value image data, the resolution of which is lowered by the resolution conversion circuit 214, is stored in the multi-level value buffer 216. This state is shown in FIG. 25(a). The image in FIG. 25(a) includes a photographic area 230 and a character area 231.

Referring to FIG. 25(b), the CPU 201 fetches the multi-level value data from the multi-level value buffer 216 via the system bus 207 and causes the frame buffer 202 to store the fetched data. This data is displayed on the CRT 203. The operator designates the photographic area 230 with the PD 205 while visually observing the image on the CRT 203. The bits of an area 232 which corresponds to the photographic area 230 are inverted, thereby storing the area data (FIG. 25(c)).

When the operator designates shifting of the photographic area 230 with the PD 205, the photographic area 230 is shifted in the frame buffer 202, as shown in FIG. 25(d). The photographic area on the CRT 203 is shifted accordingly. When the above editing operation is completed, the photographic area 230 is shifted in the bi-level value buffer 215, the multi-level value buffer 216, and the area control buffer 218 in accordance with the editing end instruction input by the operator (FIG. 25(e)).

The image data and area data 220 are simultaneously read out from the buffers 215 to 218 in accordance with a printing instruction from the keyboard 204. The bi-level value data from the bi-level value buffer 215 is converted by the multi-level/bi-level converter 213 into the multi-level image data. The low-resolution multi-level value data in the multi-level value buffer 216 is expanded by the resolution conversion circuit 214 such that the resolution thereof matches with the resolution (dot density) of the bi-level value data. These two data are switched by the switching circuit 219 in accordance with the area data 220 read out from the area control buffer 218. As for the photographic area 232, the output from the resolution conversion circuit 214 is selected. As for the remaining area, the output from the multi-level/bi-level converter 213 is selected. The selected outputs are supplied to the printer 209. As a result, the character area is expressed by a high-resolution bi-level value image, and the photographic area is expressed by the low-resolution multi-level value data with 256 gray scale levels.

If the resultant data is to be stored in the disc drive 6, the bi-level/multi-level image data extracted according to the area data 20 are properly compressed, and the compressed data are stored in the disc drive 6, thereby greatly compressing the image data.

Image editing is exemplified in the above embodiment. However, a variety of applications may be utilized within the scope of the invention. In the above embodiment, bi-level and multi-level value images are processed. However, the same techniques as described above can be applied to area control of predetermined threshold value processing and dither processing for only a bi-level value image.

According to the above embodiment, the high-resolution bi-level image and the low-resolution multi-level image which are prepared on the basis of single high-resolution multi-level data can be input to or output from the independent bi-level and multi-level value buffers. At the same time, each buffer can be randomly accessed via the system bus on the host computer side. The host computer can arbitrarily use each buffer to process high-quality images by using a small number of data.

Figure 26:
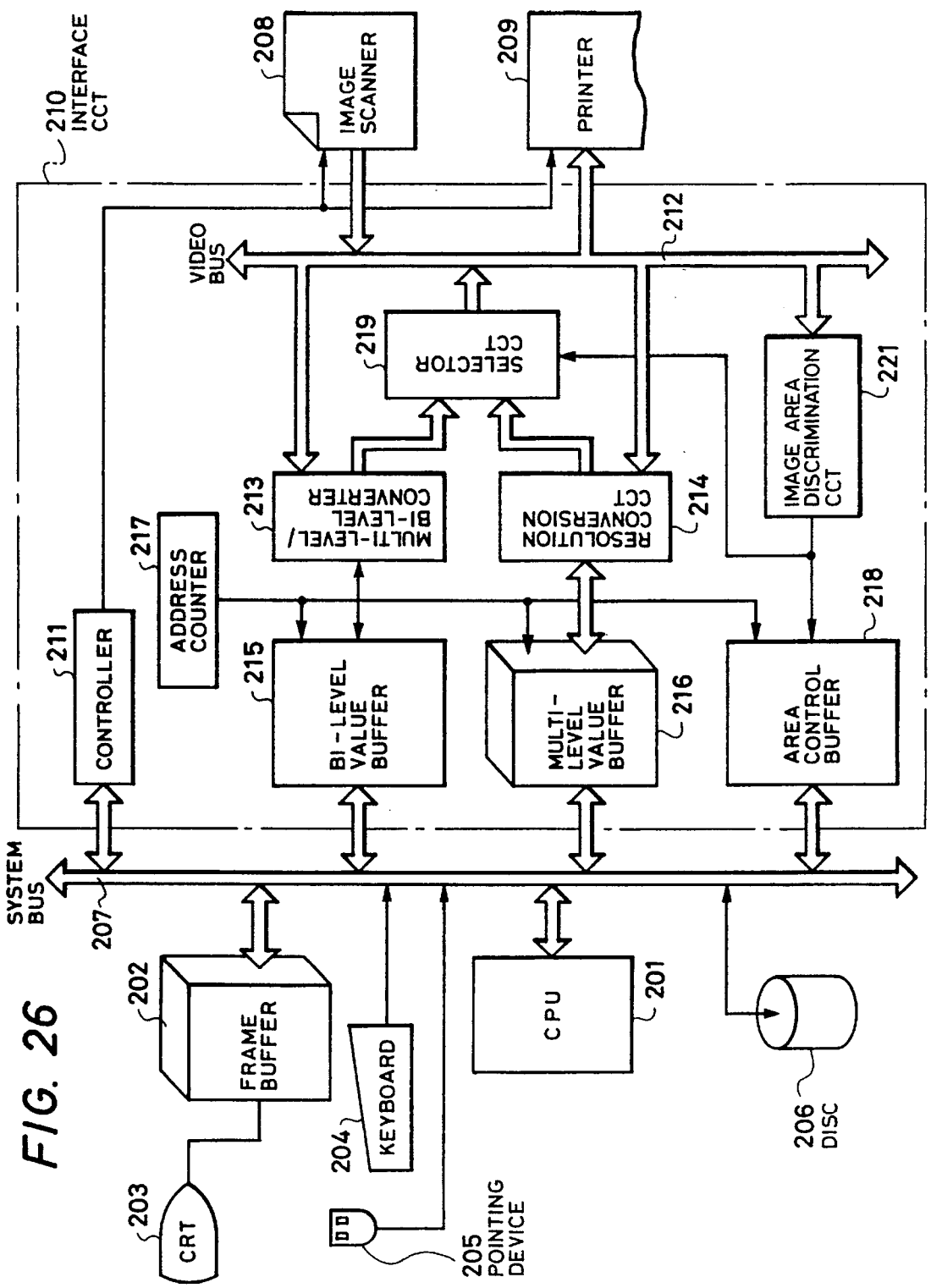
FIG. 26 is a block diagram showing a modification of the image processing system employing the interface circuit shown in FIG. 23.

FIG. 26 shows a system in which an image area discrimination circuit 221 is added to the arrangement of FIG. 23. The image area discrimination circuit 221 uses the density values of the pixels adjacent to the image data from the image scanner 208 and discriminates an edge portion from a nonedge portion in the image. The edge portion is discriminated as the bi-level value area, and the nonedge portion is discriminated as the multi-level value area. The discrimination result is output as area data 220. An area buffer 218 stores the area data 220 from the image area discrimination circuit 221 such that the bits of the photographic area 232 are inverted. The timing of the area buffer 218 shown in FIG. 25(a) is the same as that in FIG. 25(c).

A combining circuit for combining outputs from the multi-level/bi-level converter 213 and the resolution conversion circuit 214 and outputting a composite signal may be arranged in place of the switching circuit 219 shown in FIGS. 23 and 26. In this case, after the step in FIG. 25(e) during image editing, the operator must designate the photographic area in the image displayed on the CRT 203 and the area 230 in the bi-level value buffer and the area 231 in the multi-level value buffer 216 in FIG. 25(e) in order to prevent double overlapping when two images are combined.

What is claimed is:

1. An image processing apparatus comprising:

memory means comprising a first memory area and a second memory area, said first memory area being structured and arranged to store therein data representing a plurality of pixels of image data, each such pixel being represented by a respective plural-bit datum stored in said first memory area, and said second memory area being structured and arranged to store therein data representing a plurality of pixels of image data, each such pixel being represented by a respective one-bit datum stored in said second memory area; and output means for reading from said memory means, as plural-bit data each representing one pixel, both the plural-bit data stored in said first memory area and the one-bit data stored in said second memory area, and for combining the plural-bit data and the one-bit data to form combined data, to output the combined data.

2. An apparatus according to claim 1, wherein said output means comprises converter means for converting each of the one-bit data into a respective plural-bit datum having one or the other of two levels corresponding respectively to two predetermined levels of data.

3. An apparatus according to claim 1, wherein the one-bit data represents image including characters and/or a figure.

4. An apparatus according to claim 1, further comprising input means for entering image data read by scanning an original, as data each having plural bits, wherein said first memory area stores the plural-bit data so entered through said input means.

5. An apparatus according to claim 1, wherein the plural-bit data have a sufficient number of bits to represent a high degree of tonality and the one-bit data have a higher resolution than the plural-bit data.

6. An apparatus according to claim 1, wherein the plural-bit data is color data or monochrome tone data.

7. An apparatus according to claim 1, wherein the one-bit data is output as plural-bit data by representing each pixel with a string of "0" bits or a string of "1" bits.

8. A method of processing image data for producing image data on the basis of data read out from a memory means and outputting the produced image data to an output means, comprising the steps of:

an image processing apparatus-implemented step of producing a first plurality of pixels of image data within a predetermined area of an image, each such pixel being represented by a respective plural-bit datum read out from the memory means;

an image processing apparatus-implemented step of producing a second plurality of pixels of image data outside of the predetermined image area, each such pixel being represented by a respective one-bit datum read out from the memory means;

an image processing apparatus-implemented step of generating both data indicating output position of the plural-bit data and data indicating output position of the one-bit data; and an image processing apparatus-implemented step of outputting each pixel of both the first and the second pluralities of pixels of image data as a respective plural-bit datum, the outputting being controlled on the basis of the data generated in said generating step.

9. A method according to claim 8, further comprising the step of converting each of the one-bit data into a respective plural-bit datum having one or the other of two levels corresponding respectively to two predetermined levels of data.

10. A method according to claim 8, wherein the one-bit data represents image including a character and/or a figure.

11. A method according to claim 8, wherein the plural-bit data have a sufficient number of bits to represent a high degree of tonality and the one-bit data have a higher resolution than the plural-bit data.

12. A method according to claim 8, wherein the data generated in said generating step to indicate an output position indicates starting point, height and width of a rectangle of a plural-bit-data output area, represented by a rectangular coordinate system.

13. A method according to claim 8, wherein a horizontal output position of the data generated in said generating step to indicate an output position is obtained by counting a number of pixels from a horizontal sync signal, and a vertical output position of the generated data is obtained by counting a number of the horizontal sync signals from the vertical sync signal.

14. A method according to claim 8, further comprising the step of storing the data generated in said generating step to indicate an output position, wherein the stored data is read out on the occasion of data output.

15. A method according to claim 8, wherein one bit of the generated output position data determines for each pixel whether the pixel is printed as a one-bit or as a plural-bit datum.

16. An image processing apparatus comprising:

input means for entering image data;

memory means having a first memory area and a second memory area, said first memory area being structured and arranged to store therein, with a first resolution, a plurality of pixels of image data entered through said input means, each such pixel being represented by a respective plural-bit datum, and said second memory area being structured and arranged to store therein, with a second resolution higher than the first resolution, the plurality of pixels of image data entered through said input means, each pixel being represented in said memory area by a respective one-bit datum;

interpolation means for interpolating image data read from said first memory area for resolution conversion from the first resolution to the second resolution; and output means for outputting combined data which includes image data read from said first memory area and interpolated by said interpolation means and image data read from said second memory area.

17. An apparatus according to claim 16, wherein said output means is adapted to convert the one-bit data into respective plural-bit data and to output the plural-bit data so produced.

18. An apparatus according to claim 16, wherein the one-bit data stored in said second memory area represents image including characters and/or a figure.

19. An apparatus according to claim 16, wherein said input means comprises scanner means for entering image data read by scanning an original, as the plural-bit data, or an input unit for entering one-bit data representing an image such as characters or a figure.

20. An apparatus according to claim 16, wherein the plural-bit data have a sufficient number of bits to represent a high degree of tonality and the one-bit data have a higher resolution than the plural-bit data.

21. An apparatus according to claim 19, wherein said input means is a keyboard for entering one-bit data representing an image such as characters or a figure.

22. An apparatus according to claim 16, wherein, in outputting the combined data, one-bit data and plural-bit data are selectively switched in accordance with output position data and output.

23. An apparatus according to claim 22, wherein the one-bit data and the plural-bit data are selectively switched by logical operation between the one-bit data and the plural-bit data.

24. An image processing method comprising the steps of:

an image processing apparatus-implemented step of storing with a first resolution, in a first memory area of a memory means, a plurality of pixels of image data entered by input means, each such pixel being represented by a respective plural-bit datum;

an image processing apparatus-implemented step of storing, in a second memory area of the memory means, with a second resolution higher than the first resolution, the plurality of pixels of image data entered in said entering step, each pixel being represented in the second memory area by a respective one-bit datum;

an image processing apparatus-implemented step of interpolating image data read from the first memory area for resolution conversion from the first resolution to the second resolution; and an image processing apparatus-implemented step of outputting combined data which includes image data read from the first memory area and interpolated in said interpolating step and image data read from the second memory area.

25. A method according to claim 24, wherein, in said outputting step, the one-bit data are converted into respective plural-bit data and the plural-bit data so produced are output.

26. A method according to claim 24, wherein the one-bit data stored in the second memory area represent image including characters and/or a figure.

27. A method according to claim 24, wherein said entering of image data by input means comprises entering image data read by scanning an original, as the plural-bit data, and entering one-bit data representing an image such as characters or a figure.

28. A method according to claim 24, wherein the plural-bit data have a sufficient number of bits to represent a high degree of tonality and the one-bit data have a higher resolution than the plural-bit data.

29. A method according to claim 27, wherein said entering of image data by input means is performed using a keyboard for entering one-bit data representing an image such as characters or a figure.

30. A method according to claim 24, wherein, in outputting the combined data, one-bit data and plural-bit data are selectively switched in accordance with output position data and output.

31. A method according to claim 30, wherein the one-bit data and the plural-bit data are selectively switched by logical operation between the one-bit data and the plural-bit data.

* * * * *